United States Patent
Zarrouk

(10) Patent No.: US 11,702,160 B2
(45) Date of Patent: Jul. 18, 2023

(54) ROBOT MANEUVERABLE BY COMBINED SPRAWL AND FOUR-BAR EXTENSION MECHANISMS

(71) Applicant: B.G. NEGEV TECHNOLOGIES AND APPLICATIONS LTD., AT BEN-GURION UNIVERSITY, Beer-Sheva (IL)

(72) Inventor: David Zarrouk, Bnei Brak (IL)

(73) Assignee: B.G. NEGEV TECHNOLOGIES AND APPLICATIONS LTD., AT BEN-GUIRON UNIVERSITY, Beer-Sheva (IL)

(*) Notice: Subject to any disclaimer, the term of this patent is extended or adjusted under 35 U.S.C. 154(b) by 409 days.

(21) Appl. No.: 16/958,431

(22) PCT Filed: Dec. 26, 2018

(86) PCT No.: PCT/IL2018/051393
§ 371 (c)(1),
(2) Date: Jun. 26, 2020

(87) PCT Pub. No.: WO2019/130303
PCT Pub. Date: Jul. 4, 2019

(65) Prior Publication Data
US 2021/0009219 A1    Jan. 14, 2021

Related U.S. Application Data

(60) Provisional application No. 62/610,961, filed on Dec. 28, 2017.

(51) Int. Cl.
*B62D 57/028* (2006.01)
*B62D 57/024* (2006.01)

(52) U.S. Cl.
CPC ......... *B62D 57/028* (2013.01); *B62D 57/024* (2013.01)

(58) Field of Classification Search
CPC ........................... B62D 57/028; B62D 57/024
See application file for complete search history.

(56) References Cited

U.S. PATENT DOCUMENTS

| 2005/0275367 | A1  |   | 12/2005 | Buehler et al. |
| 2020/0180168 | A1  | * | 6/2020  | Han .................. B25J 9/0009 |

FOREIGN PATENT DOCUMENTS

| CN | 102092428 | A |   | 6/2011 |                    |
| CN | 110015353 | A | * | 7/2019 |                    |
| KR | 2016134999 | A | * | 11/2016 | ........... B08B 9/049 |
| WO | 2016/189309 | A1 |   | 12/2016 |                    |

OTHER PUBLICATIONS

International Search Report and Written Opinion issued for International Application No. PCT/IL2018/051393 dated Apr. 15, 2019, 10 pages.

(Continued)

*Primary Examiner* — Kevin Hurley
(74) *Attorney, Agent, or Firm* — Rothwell, Figg, Ernst & Manbeck, P.C.

(57) ABSTRACT

A robot device comprising a main body portion and two elongated legs, wherein: a) each of said legs is connected to said main body portion by a four-bar extension mechanism; and b) each one of said legs is rotatable around a corresponding axis positioned along the distal-proximal direction.

18 Claims, 17 Drawing Sheets

(56) References Cited

OTHER PUBLICATIONS

Karydis et al: In 2014 IEEE/RSJ International Conference on Intelligent Robots and Systems (pp. 3033-3038) IEEE (2014).
Mazouchova et al: Flipper-driven terrestrial locomotion of a sea turtle-inspired robot: Bioinspiration & biomimetics, vol. 8, No. 2 (2013) abstract only.
Acrobatics of STAR.V3, UC Berkeley, a high speed 3D printed robot. David Zarrouck et al., UC Berkeley May 24, 2013 (May 24, 2013) Start robot with sprawl mechanism plus wheel mechanis, Retrieved from: <https://www.youtube.com/watch?v=vXVRCpDLSHI&feature=youtube>, accompanying with download copy of the video 12 pages.
Zarrouk et al: "STAR-Sprawl tuned autonomous robot", IEEE Int. Conf. on Robotics & Automation, pp. 20-25, 2013.
Zarrouk et al: "Controlled in-plane locomotion of a hexapod using a single actuator", IEEE Trans. On Robotics, vol. 31, No. 1, pp. 157-167, 2015.
Zarrouk lab, "Crawling Without Turning The Wheels—Bio-Inspired "Turtle Walk" For Challenging Terrain" Jun. 20, 2018, Retireved from: <https://www.youtube.com/watch?v=XI_aepVAuxY>, accompanying with download copy of the video 16 pages.
ICRA 2018, "Rising STAR, a Highly Reconfigurable Sprawl Tuned Robot" May 16, 2018. Retrieved from: <https://www.youtube.com/watch?v=Hfewf-V22O0>, accompanying with download copy of the video 11 pages.

\* cited by examiner

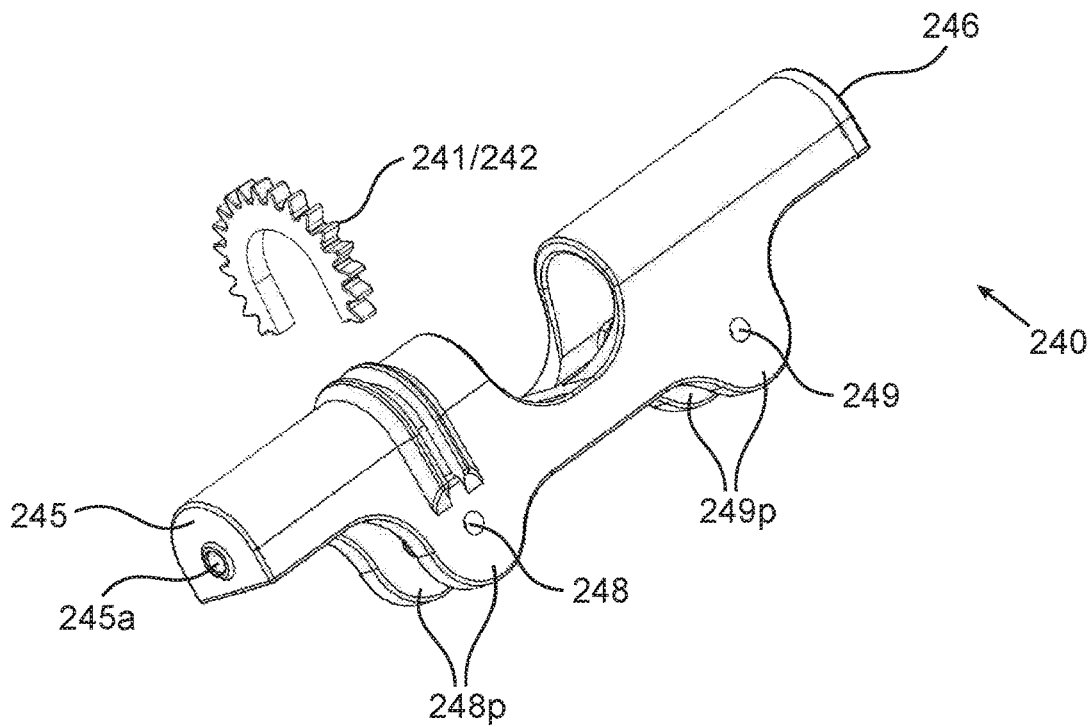
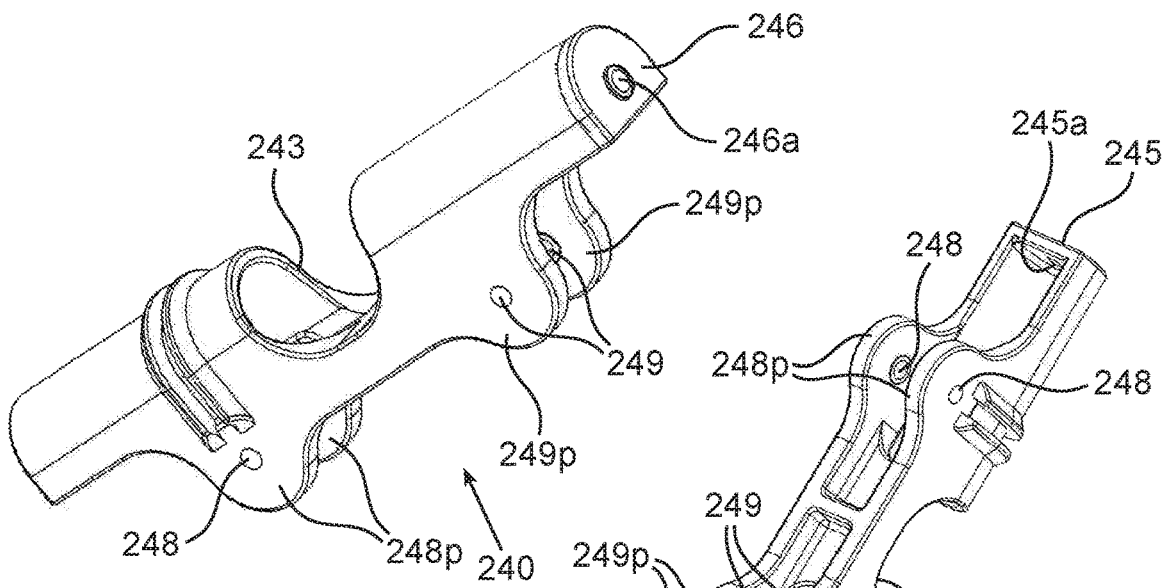
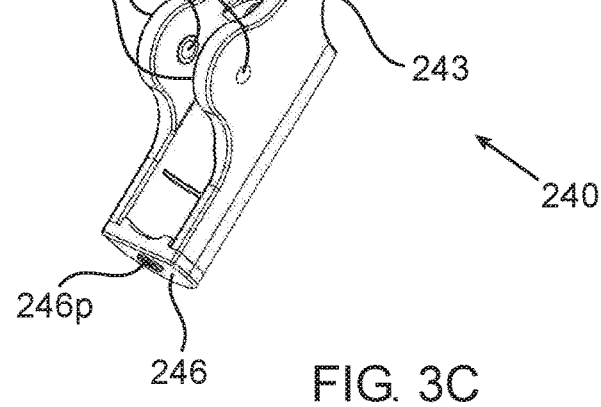
FIG. 3A
FIG. 3B
FIG. 3C

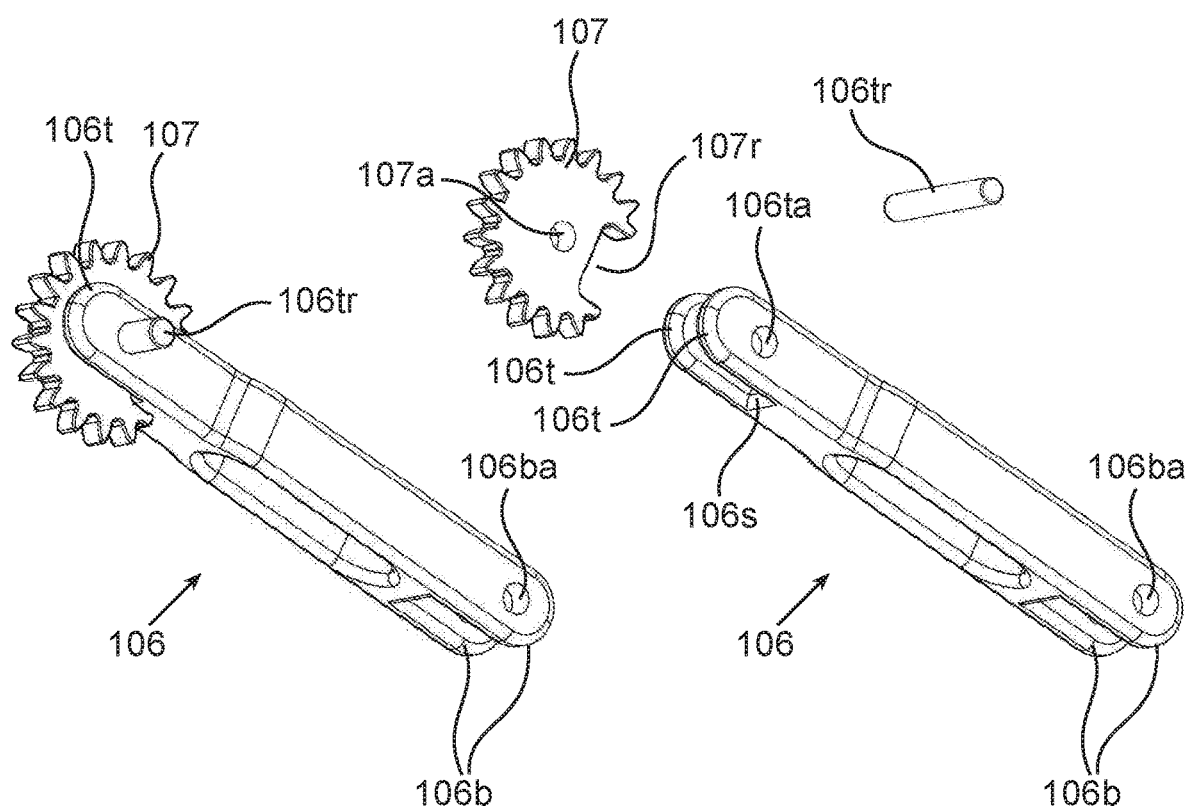
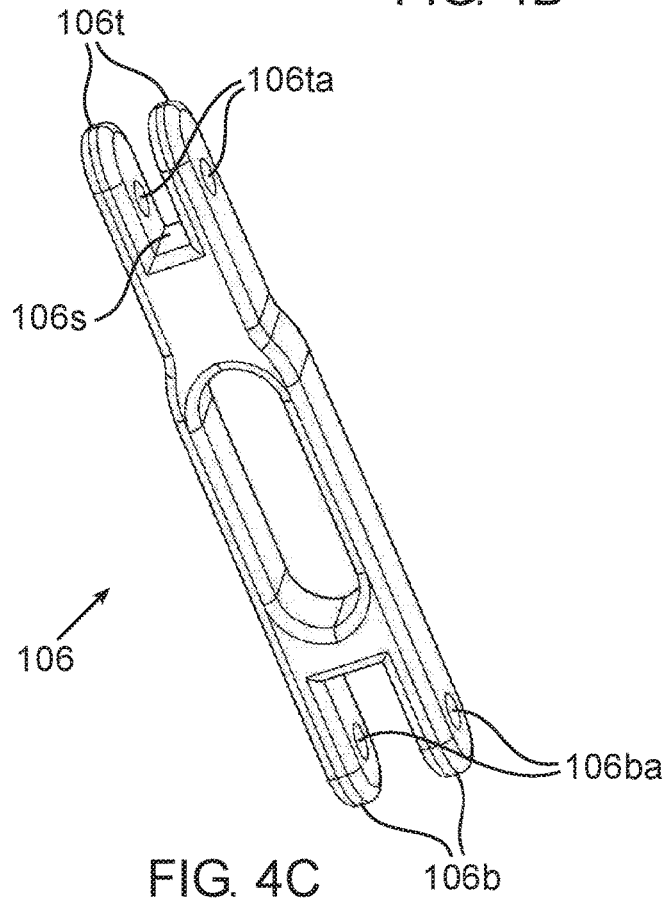
FIG. 4A  FIG. 4B  FIG. 4C

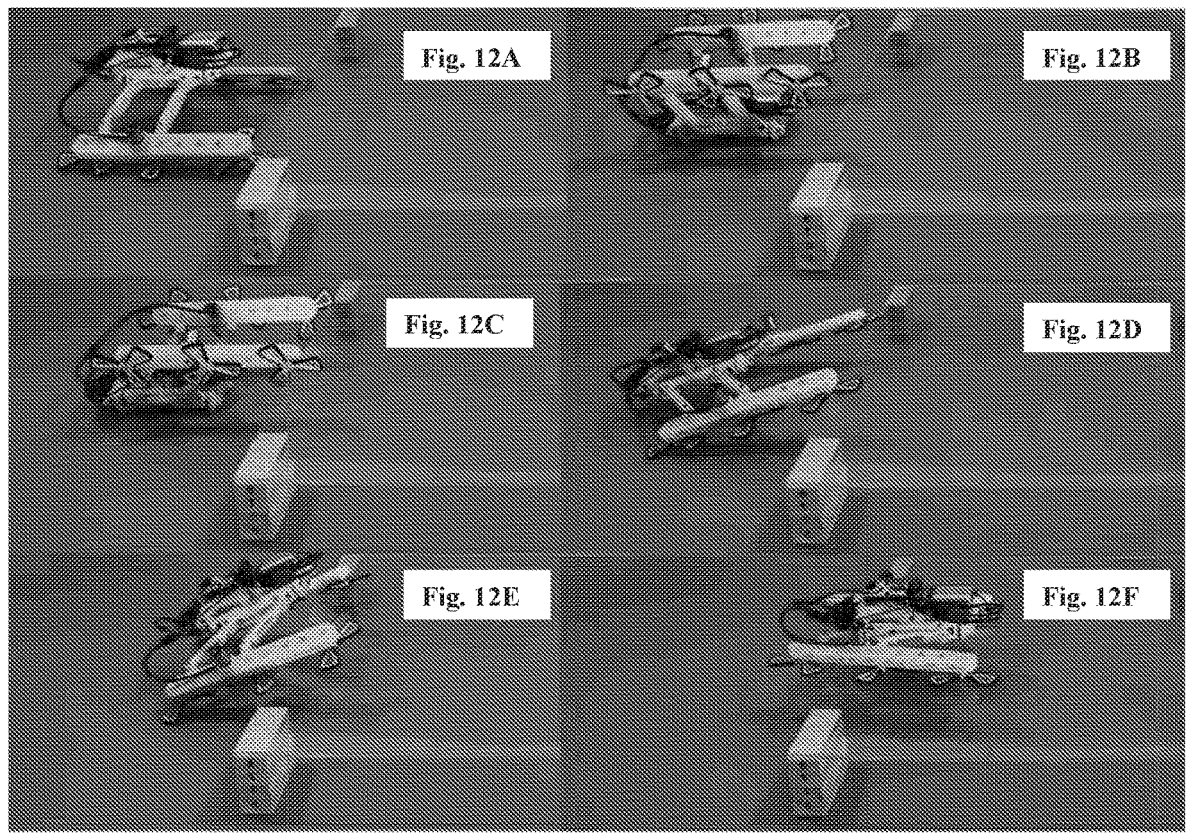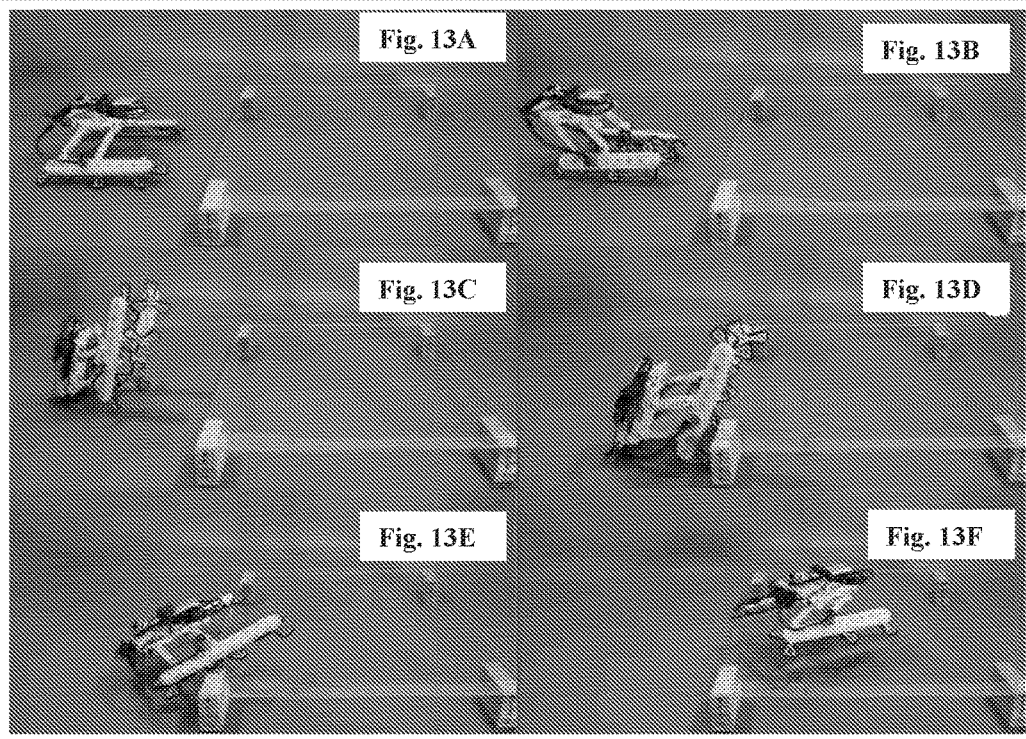

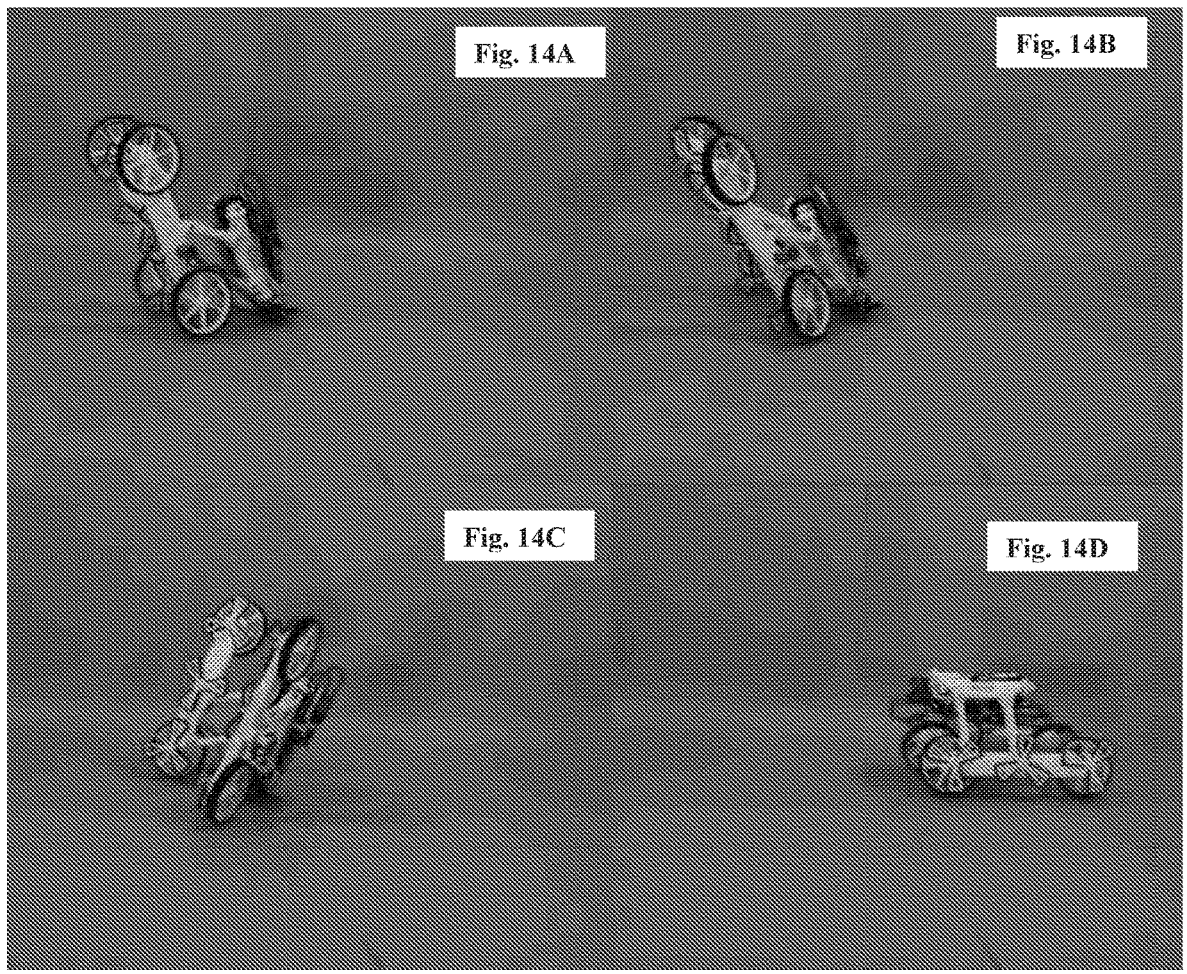
Fig. 15

... # ROBOT MANEUVERABLE BY COMBINED SPRAWL AND FOUR-BAR EXTENSION MECHANISMS

CROSS-REFERENCE TO RELATED APPLICATION(S)

This application is a 35 U.S.C. 371 National Phase Entry Application from PCT/IL2018/051393 filed on Dec. 26, 2018, which claims the benefit of the filing date of U.S. Provisional Application No. 62/610,961 filed on Dec. 28, 2017, the entire contents of which are incorporated herein by reference.

FIELD OF THE INVENTION

The present invention relates to the field robotics. More particularly, the present invention relates to a mechanical robot capable of being maneuvered by a sprawl mechanism in conjunction with a Four-Bar Extension Mechanism (FBEM).

BACKGROUND OF THE INVENTION

Miniature crawling robots have been developed for off-road tasks such as search and rescue, excavation and reconnaissance missions. Their small size, low weight and high navigability enable their deployment in large numbers to quickly inspect a large area. Some palm sized robots can crawl at many times their body length per second. Designing minimally actuated mechanisms is imperative at this scale given the inherent difficulty of implementing controlled active leg joints. Passive mechanical elements such as using springy legs and damping systems to achieve high speed while maintaining stability such as found in insects have been investigated by research groups. Research groups have developed crawling models with similarity to the locomotion of insects in the sagittal plane and in-plane (lateral).

In parallel, multiple attempts have been made to produce robots with reconfigurable kinematics to overcome obstacles. They include multiple interesting mechanisms which transform wheels into legs or transform their external shape to roll over surfaces and overcome obstacles.

D. Zarrouk, A. Pullin, N. J. Kohut, and R. S. Fearing, "*STAR—Sprawl Tuned Autonomous Robot*", *IEEE Int. Conf. on Robotics and Automation*, pp. 20-25, 2013, relates to a sprawl tuned autonomous robot (STAR) which can actively adjust its sprawl angle to transform its dynamics between the lateral and the sagittal planes through the use of a variable sprawl angle. STAR exhibited many unique capabilities such as moving on varying terrain surfaces and traversing obstacles.

D. Zarrouk, and R. S. Fearing, "*Controlled In-Plane Locomotion of a Hexapod Using a Single Actuator*", *IEEE Trans. on Robotics*, Vol. 31, No. 1, pp. 157-167, 2015, relates to a robot that is driven by a single actuator but can be directly commanded to move straight or turn clockwise or counterclockwise. The legged robot relies on a novel actuation gait, which exploits the compliance disparity between alternate stance tripods, to generate rotation by continuously accelerating and decelerating the legs. The direction of turning depends on the configuration of the legs-tripod left or right-and the timing of the acceleration and deceleration. Alternating leg acceleration in successive steps allows for continuous rotation in the desired direction. The turning radius can be varied by changing the timing of the leg acceleration and deceleration without changing the cycle frequency and linear speed.

P. K. Karidis, D. Zarrouk, I. Poulakakis, R. S. Fearing, and H. G. Tanner, "*Planning with the STAR(s)*", *IEEE Int. Conf. on Intelligent Robots and Systems*, pp. 3033-3038, 2014, relates to a turtle-like robot with flipper-based terrestrial locomotion and with capabilities of altering the robot tilt angle.

However, there still is a need to provide a robot with substantially improved locomotion and maneuverability capabilities. It is therefore an object of the present invention to provide a robot with highly efficient locomotion capabilities with various advantages.

Other objects and advantages of the present invention will become apparent as the description proceeds.

SUMMARY OF THE INVENTION

The present invention relates to robot device maneuverable by a combined sprawl mechanism and Four-Bar Extension Mechanism (FBEM). The robot device comprises a main body portion and two elongated legs, wherein the two elongated legs are each connected to the main body portion by a FBEM. The FBEM is such that for each elongated leg, two bars connect the elongated leg to the main body portion at four joints. Both FBEMs (on each side of the robot device each connected to one leg) are also each entirely rotatable (regardless of the FBEM motions), each one around a corresponding axis (both of said axes being in the fore-aft direction), forming the sprawl mechanism.

Preferably, the connection is such that a changeable parallelogram is formed, wherein the elongated legs remain parallel to the main body portion longitudinal axis (fore-aft axis) when moved. Thus the legs move distally or proximally and at the same time towards or away from the main body portion.

According to a preferred embodiment both FBEMs (and corresponding legs connected thereto) can rise and be lowered around their corresponding axes, both either lifted together or lowered together (for example like the wings of a flying bird). Also, the FBEMs are preferably maneuvered such that both elongated legs move distally together or proximally together (in relation to the main body portion).

Technically the main body portion can be the one which actually moves distally/proximally when the elongated legs are placed on the surface that they engage. Technically the main body portion can be the one which actually moves (upwards/downwards) when the elongated legs are placed on the surface that they engage and the sprawl mechanism is applied. Typically, once the sprawl mechanism and FBEM are in the desired position the elongated legs' wheels are activated for the robot device locomotion.

The present invention relates to a highly reconfigurable robot. The present invention robot has sprawling capabilities allowing it to run in a planar configuration, either upright or inverted and change its mechanics from the lateral to the sagittal planes. The present invention comprises a four-bar extension mechanism (FBEM) allowing it to extend the distance between its body and legs. This combination of sprawling and extension mechanisms enables the present invention to overcome extremely challenging obstacles, crawl over flexible and slippery surfaces and even climb vertically in a tube or between two walls. The present invention robot can extend its height and width (e.g. threefold) and move its center of mass both in the fore-aft and vertical directions. The robot can run upside down and climb over obstacles that are even higher than the diameter of its wheeled legs using a turtle-like gait. To increase its mobility, the present invention may be fitted with wheels or spoked legs or a combination of the two, giving it superiorability to engage different terrains.

The present invention robot is reconfigurable and is fitted with two unique mechanisms; a sprawl mechanism that tilts the rotation axis of the legs, and a four-bar extension mechanism (FBEM) that prolongs the distance between the body and the legs and moves the COM in the fore-aft direction. The sprawl, allows the robot to change its dynamics from the lateral to the sagittal plane and for inverted locomotion. The FBEM extends the length of the legs while keeping them parallel to the body. Using a combination of these two mechanisms, the robot can extend (or shrink) its width and height (e.g. threefold and even more) and move the COM in both the fore-aft and vertical directions.

The present invention can perform a unique turtle locomotion gait which allows the robot to crawl over extremely soft or granular surfaces such as thick mud or sand where the wheels would get entrenched. The turtle gait can also be used to climb over obstacles whose height is greater than the diameter of its spoke wheels. By extending/narrowing its width the robot is capable of crawling vertically in a tube or between two walls by applying pressure to the walls.

The present invention robot can also flip its body upside down by changing the position of its Center of Mass (COM). This feature can be used to decrease its cost of transport and reduce oscillations by fitting its legs with regular wheels on one side for running over smooth surfaces and fitting spoke legs on the other side for running over unstructured terrains.

The present invention relates to a robot device comprising a main body portion and two elongated legs, wherein:

a) each of said legs is connected to said main body portion by a four-bar extension mechanism; and b) each one of said legs is rotatable around a corresponding axis positioned along the distal-proximal direction.

Preferably, the two elongated legs are substantially positioned in the distal-proximal direction.

Preferably, each four-bar extension mechanism comprises a distal bar and a proximal bar;

wherein the proximal bar is connected at one end to the main body portion in a first joint connection and at the other end to the elongated leg in a second joint connection;

wherein the distal bar is connected at one end to the elongated leg in a third joint connection and at the other end to the main body portion in a fourth joint connection.

Preferably, the distance between the first joint and second joint is equal to the distance between the third joint and fourth joint;

and wherein the distance between the first joint and fourth joint is equal to the distance between the second joint and third joint.

Preferably, the joints are revolute joints.

Preferably, the main body portion comprises two side rotatable shafts, each rotatable around a corresponding axis of said corresponding axes;

wherein in each four-bar extension mechanism the connections of the proximal and distal bars with the main body portion are at a corresponding rotatable shaft of said two rotatable shafts.

Preferably, the main body portion comprises two side longitudinal rods, wherein each rotatable shaft is mounted on a corresponding rod of said two side longitudinal rods.

Preferably, the robot device further comprises a sprawl motor and a sprawl gear system, wherein said sprawl motor is configured to generate said sprawl gear system to cause the shafts to rotate to the same extent in opposite directions.

Preferably, the sprawl gear system is a spur gear system.

Preferably, the robot device comprises a first spinning spur gear and a second spinning spur gear;

wherein each of the rotatable shafts comprise an arched shaped spur gear element;

wherein the sprawl motor is configured to rotate the first spinning spur gear;

wherein the first spinning spur gear meshes with the second spinning spur gear;

wherein the first spinning spur gear meshes with an arched shaped spur gear element of a first rotatable shaft of said rotatable shafts; and wherein the second spinning spur gear meshes with an arched shaped spur gear element of a second rotatable shaft of said rotatable shafts.

Preferably, the robot device comprises a first sprawl motor, a first sprawl gear system, a second sprawl motor and a second sprawl gear system, wherein said first sprawl motor is configured to generate said first sprawl gear system to cause one of said shafts to rotate; and wherein said second sprawl motor is configured to generate said second sprawl gear system to cause the other shaft of said shafts to rotate.

Preferably, the robot device further comprises an FBEM motor and an FBEM gear system, wherein said FBEM motor is configured to generate said FBEM gear system to cause each four-bar extension mechanism proximal and distal bars to rotate around their corresponding first and fourth joints respectively.

Preferably, each four-bar extension mechanism proximal and distal bars all move distally to the same extent or proximally to the same extent.

Preferably, the FBEM gear system comprises a worm drive arrangement.

Preferably, the main body portion comprises two side longitudinal rods;

wherein said device further comprises two side worm screws each mounded on a corresponding rod of said two side longitudinal rods;

wherein each four-bar extension mechanism comprises a first worm gear fixed to one end of the proximal bar and rotatable around the axis of its first joint and a second worm gear fixed to one end of the distal bar and rotatable around the axis of its fourth joint;

wherein each four-bar extension mechanism first and second worm gears both mesh with a corresponding side worm screw of said two side worm screws.

Preferably, the FBEM motor is configured to rotate a third worm screw that meshes with a third worm gear element and a fourth worm gear element;

wherein the third worm gear element meshes with a first side worm screw of said two side worm screws and the fourth worm gear element meshes with a second side worm screw of said two side worm screws.

Preferably, the third and fourth worm gear elements each comprise:

a top portion that meshes with the third worm screw; and a bottom portion that meshes each with its corresponding side worm screw.

Preferably, the main body portion comprises two side rotatable shafts, each rotatable around a corresponding axis of said corresponding axes;

wherein in each four-bar extension mechanism the connections of the proximal and distal bars with the main body portion are at a corresponding rotatable shaft of said two rotatable shafts;

wherein each rotatable shaft is mounted on a corresponding rod of said two side longitudinal rods;

wherein each rotatable shaft comprises a central opening;

wherein the third worm gear element meshes with a first side worm screw of said two side worm screws through a corresponding central opening of said central openings and the fourth worm gear element meshes with a second side worm screw of said two side worm screws through a corresponding central opening of said central openings.

Preferably, the FBEM gear system comprises a rack and pinion arrangement;

wherein the main body portion comprises two side longitudinal rods;

wherein said device further comprises two side rack elements each mounded on a corresponding rod of said two side longitudinal rods;

wherein each four-bar extension mechanism comprises a first pinion element fixed to one end of the proximal bar and rotatable around the axis of its first joint and a second pinion element fixed to one end of the distal bar and rotatable around the axis of its fourth joint;

wherein each four-bar extension mechanism first and second pinion elements both mesh with a corresponding side rack element of said two side rack elements.

Preferably, the FBEM motor is configured to rotate a worm screw that meshes with a first worm gear element and a second worm gear element;

wherein said first worm gear element comprises a third pinion element;

wherein said second worm gear element comprises a fourth pinion element;

wherein the third pinion element meshes with a first side rack element of said two side rack elements; and the fourth pinion element meshes with a second side rack element of said two side rack elements.

Preferably, the first worm gear element comprises a top portion that meshes with the worm screw and a bottom portion comprising the third pinion element; and wherein the second worm gear element comprises a top portion that meshes with the worm screw and a bottom portion comprising the fourth pinion element.

Preferably, the main body portion comprises two side rotatable shafts, each rotatable around a corresponding axis of said corresponding axes;

wherein in each four-bar extension mechanism the connections of the proximal and distal bars with the main body portion are at a corresponding rotatable shaft of said two rotatable shafts;

wherein each rotatable shaft is mounted on a corresponding rod of said two side longitudinal rods;

wherein each rotatable shaft comprises a central opening;

wherein the third pinion element meshes with a first side rack element of said two side rack elements through a corresponding central opening of said central openings and the fourth pinion element meshes with a second side rack element of said two side rack elements through a corresponding central opening of said central openings.

Preferably, the robot device comprises a first FBEM motor, a first FBEM gear system, a second FBEM motor and a second FBEM gear system, wherein said first FBEM motor is configured to generate said first FBEM gear system to cause one leg of said legs to move; and wherein said second FBEM motor is configured to generate said second FBEM gear system to cause the other leg of said legs to move.

Preferably, each elongated leg comprises:
a leg motor;
two or more wheels;
a leg gear system;
wherein said leg motor is configured to generate said leg gear system to cause said two or more wheels to rotate.

Preferably, the leg gear systems are spur gear systems.

Preferably, the robot device comprises a plurality of adjacent meshing spur gears wherein each two adjacent spur gears of said plurality of adjacent meshing spur gears mesh with one another;

wherein each one of said two or more wheels and a corresponding spur gear of said plurality of adjacent meshing spur gears are mounted on a common axle and fixed thereto at their centers;

wherein each leg motor is configured to rotate one of said plurality of adjacent meshing spur gears on a corresponding leg.

Preferably, two given spur gears, each mounted on corresponding common axles of said common axles have an odd number of spur gears, of said plurality of adjacent meshing spur gears, therebetween.

Preferably, one or more of said two or more wheels are spoked wheels.

Preferably, the spoked wheels each comprise:
a central aperture configured to be mounted on an axle;
N sectors, each bounded by two arms extending outwards from
a ring portion surrounding said central aperture; and
an arc portion lying between the outer ends of the arms.

Preferably, each sector is evenly spaced apart one from the other.

Preferably, said device further comprises:
a controller connected to and configured to activate at least one of the following:
a sprawl motor as defined herein;
an FBEM motor as defined herein; and
at least one of the two leg motors as defined herein;
wherein said device further comprises a power source configured to power said sprawl motor, FBEM motor and leg motors.

The present invention relates to a system comprising:
a) the robot device as defined herein;
b) a remote-control configured to transmit instructions to activate one or more of said robot device motors.

Preferably, the system robot device comprises a receiver connected to the controller;

wherein the remote-control comprises a transmitter; and wherein said receiver is configured to receive the remote-control instructions transmitted by said transmitter to activate the one or more of said robot device motors.

Examples of videos of the present invention can be shown for example in the following links— youtube.com: Rising STAR, a miniature highly reconfigurable robot; and youtube.com: Rising STAR, a Highly Reconfigurable Sprawl Tuned Robot.

These videos assist in understanding the invention better, understanding its advantages and provide a more tangible aspect of the invention. For example, the keywords "rising star robot" in the google.com search engine uploads these links to the videos.

It should be understood herein that the front-rear directions of the robot correspond to the fore-aft directions respectively and also correspond to the distal-proximal directions respectively, and all may be used herein interchangeably. Arrow 50 (shown in FIG. 1B) points to the front/fore/distal direction (and is parallel to the robot device longitudinal axis).

BRIEF DESCRIPTION OF THE DRAWINGS

The present invention is illustrated by way of example in the accompanying drawings, in which similar references consistently indicate similar elements and in which:

FIGS. 3A-3C illustrate the robot shaft according to an embodiment of the present invention.

FIGS. 4A-4C illustrate the robot bar according to an embodiment of the present invention.

FIGS. 12A-12F show a turtle gait climbing example according to an embodiment of the present invention.

FIGS. 13A-13F show a Pitching Upward for Climbing example according to an embodiment of the present invention.

FIGS. 14A-14D show an example of the robot flipping itself upside down according to an embodiment of the present invention.

FIG. 15 shows the robot Running over a Variety of Surfaces according to embodiments of the present invention.

DETAILED DESCRIPTION OF THE INVENTION

Figure 1A:
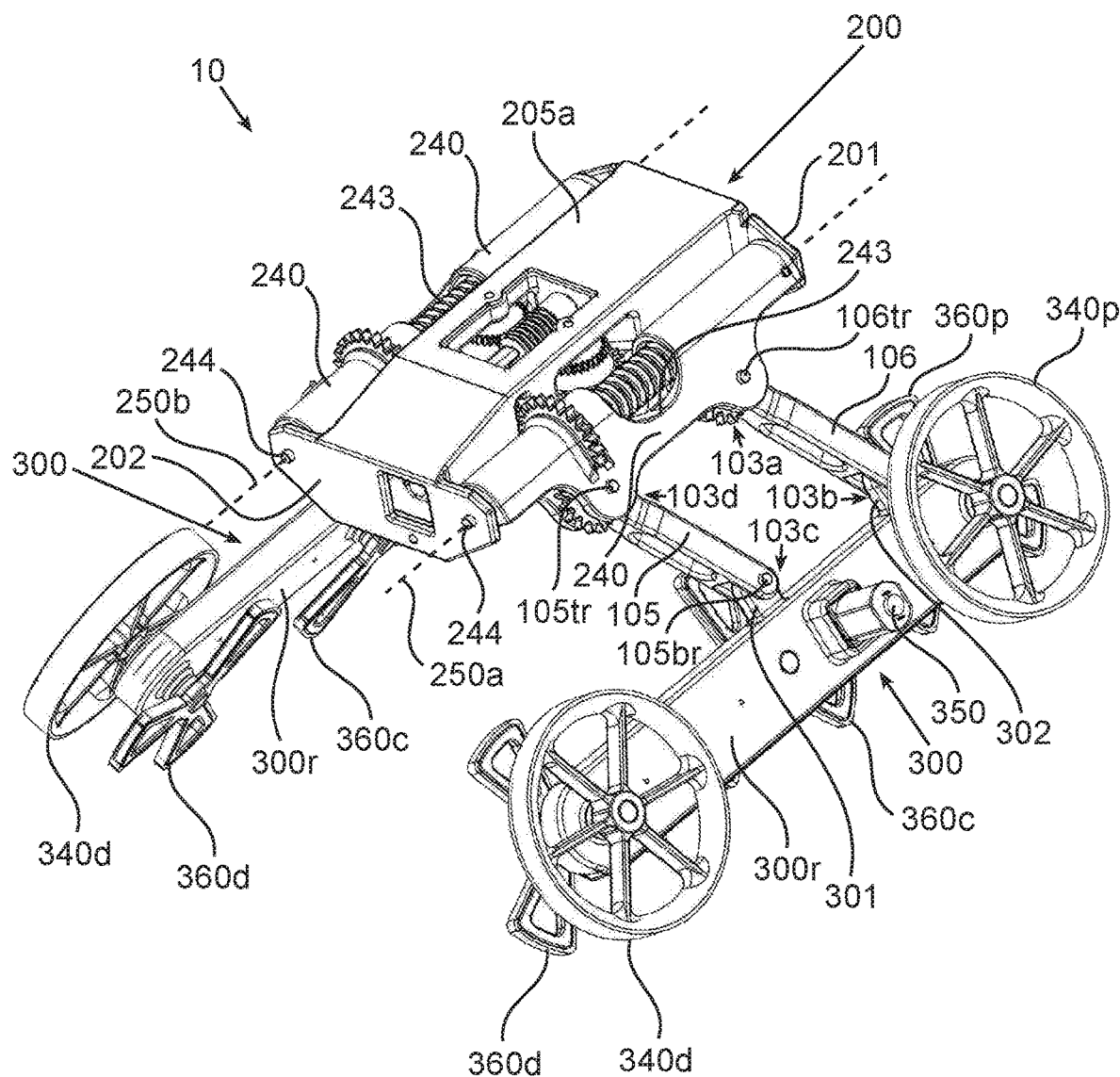
FIGS. 1A-1D illustrate portions of the robot device according to an embodiment of the present invention.

The present invention relates to a highly maneuverable robot capable of crawling over different terrains and overcoming obstacles. The present invention comprises a combination of an active variable robot sprawl angle mechanism together with a four-bar extension mechanism (FBEM) which allow the robot to transform its kinematics and substantially change its dimensions to overcome obstacles. The present invention robot can perform multiple maneuvers. The robot comprises a main body portion and two elongated legs. Each elongated leg is connected to the main body portion by a pair of parallel bars.

The sprawl mechanism provides tilting the rotation axis of each elongated leg around a substantially parallel fore-aft axis. This enables elevating and lowering the main body portion. The four-bar extension mechanism (FBEM) provides prolonging the distance between the robot main body portion and the robot legs. The FBEM enables extending the elongated legs forward or backwards (in relation to the main body portion) while keeping them substantially parallel to the main body portion (positioned in the fore-aft axis).

The operation of the robot with the sprawl mechanism in conjunction with the FBEM contributes to various types of robot maneuvering. The sprawl angle, which can be varied allows the robot to increase/decrease its width and its height. The four-bar extension mechanism (FBEM) extends the bars holding the legs and is configured to relocate the robot COM (Center Of Mass). Controlling the position of the COM has been found to improve the stability and energy requirements of crawling in animals. The propagation of the robot is carried out by a set of radially spoked legs or a set of wheels or both (preferably one set on one side and the other set on the opposite side). This contributes to improve stability of locomotion and energy consumption. The robot is also capable of carrying substantial payloads that may be required to perform search and rescue missions including, for example, cameras, communication equipment and sensors.

FIG. 1 shows an embodiment of the present invention robot device 10, comprising a main body portion 200 and two elongated side legs 300. Each one of the elongated legs 300 is substantially positioned in the robot device fore-aft direction. Each one of the elongated legs 300 is rotatable around a corresponding parallel imaginary axis (250$a$ and 250$b$). The imaginary axes 250$a$ and 250$b$ are parallel to each other (each positioned along the fore-aft direction).

The FBEM on each side of the robot device 10 comprises two parallel bars—proximal bar 106 and distal bar 105 forming a loop along with a portion of the main body portion 200 and along with a portion of the legs 300, wherein four joints are thus formed. A first joint 103$a$ is formed at the connection point between proximal bar 106 and a portion of the main body portion 200. The second joint 103$b$ is formed at the connection point between proximal bar 106 and a portion of the leg 300. The third joint 103$c$ is formed at the connection point between distal bar 105 and a portion of the leg 300 (wherein joint 103$c$ is distal to joint 103$b$). The fourth joint 103$d$ is formed at the connection point between distal bar 105 and a portion of the main body portion 200 (wherein joint 103$d$ is distal to joint 103$a$).

The joints are typically revolute (hinge) joints. The constant distance between joints 103$a$ and 103$d$ is the same constant distance as between joints 103$b$ and 103$c$. The constant distance between joints 103$a$ and 103$b$ is the same constant distance as between joints 103$c$ and 103$d$. Thus the FBEM is formed with the joints 103$a$, 103$b$, 103$c$ and 103$d$ being the vertices of a changeable parallelogram. The hinge joints 103$a$, 103$b$, 103$c$ and 103$d$ enable the changeable parallelogram vertices angles to change (and the distances between each pair of two opposite sides of the parallelogram formed change accordingly), but the parallelogram side lengths remain constant and each pair of opposite sides remain parallel one to another. In this manner the legs 300 may move distally or proximally (and closer or further away from the main body portion 200) in relation to the main body portion 200, but always stay parallel thereto.

The main body portion 200 comprises two rotatable shafts 240 on its sides (optionally hollow). Each set of bars 106 and 105 are connected to the main body portion 200 at two locations on the corresponding two side rotatable shafts 240. It should be clear that sometimes within the present specification herein, only one of the sides (including shaft 240, bars 106 and 105, the corresponding elongated leg 300, and sub-elements thereof or corresponding elements connected thereto) will be explained, for the sake of simplicity and brevity.

The robot device 10 sprawl mechanism and FBEM stay in a constant position (e.g. lock position) and do not change the position of the legs in relation to the main body portion unless actuated by a corresponding motor controlled by a control unit. The sprawl mechanism comprises one dedicated motor that actuates it. The FBEM comprises one dedicated motor that actuates it.

Sprawl Mechanism

The sprawl mechanism operates such that each rotatable shaft 240 is connected to the corresponding leg 300 by bars 106 and 105. Shaft 240 rotates around a longitudinal axis (typically its central longitudinal axis) which is imaginary axis 250a or 250b. According to one embodiment, the shaft 240 is hollow and comprises a distal surface 245 and a proximal surface 246 each comprising a corresponding aperture 245a and 246a respectively (see FIGS. 3A-3C). The apertures 245a and 246a are parallel and aligned one with the other. Typically, the distal and proximal surfaces 245 and 246 are substantially perpendicular to the central longitudinal axis of shaft 240.

Figure 2A:
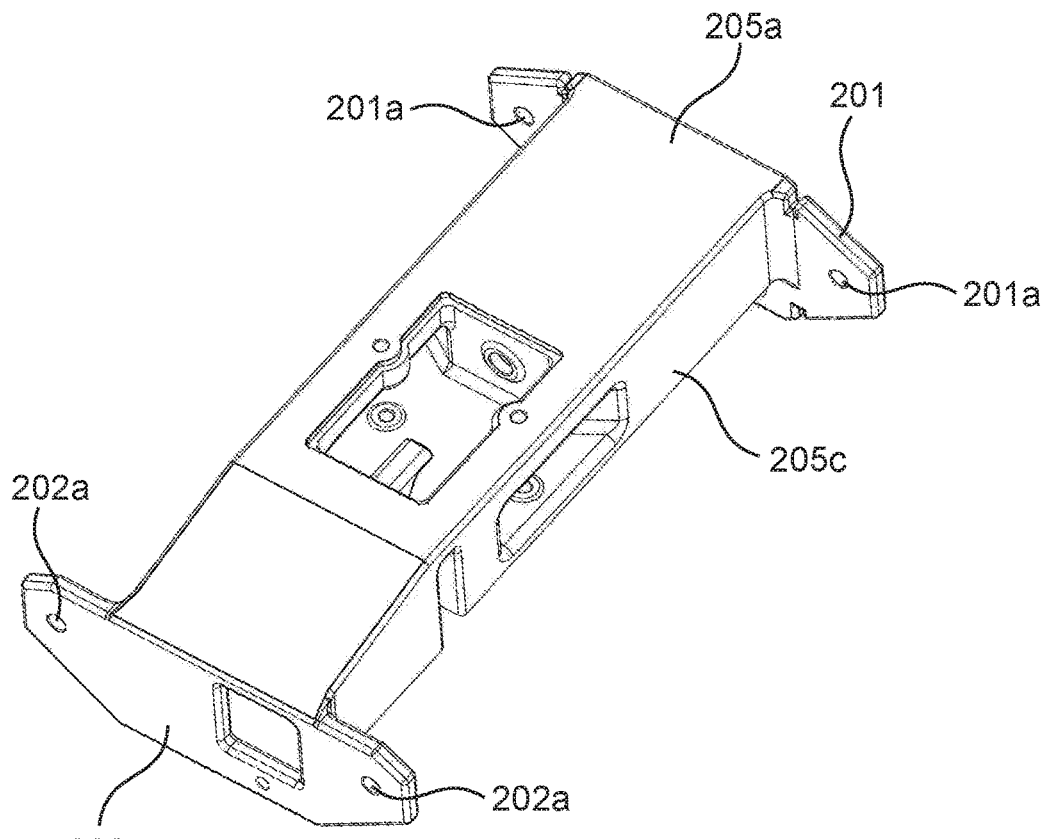
FIGS. 2A-2B illustrate the robot main body portion according to an embodiment of the present invention.
Figure 2B:
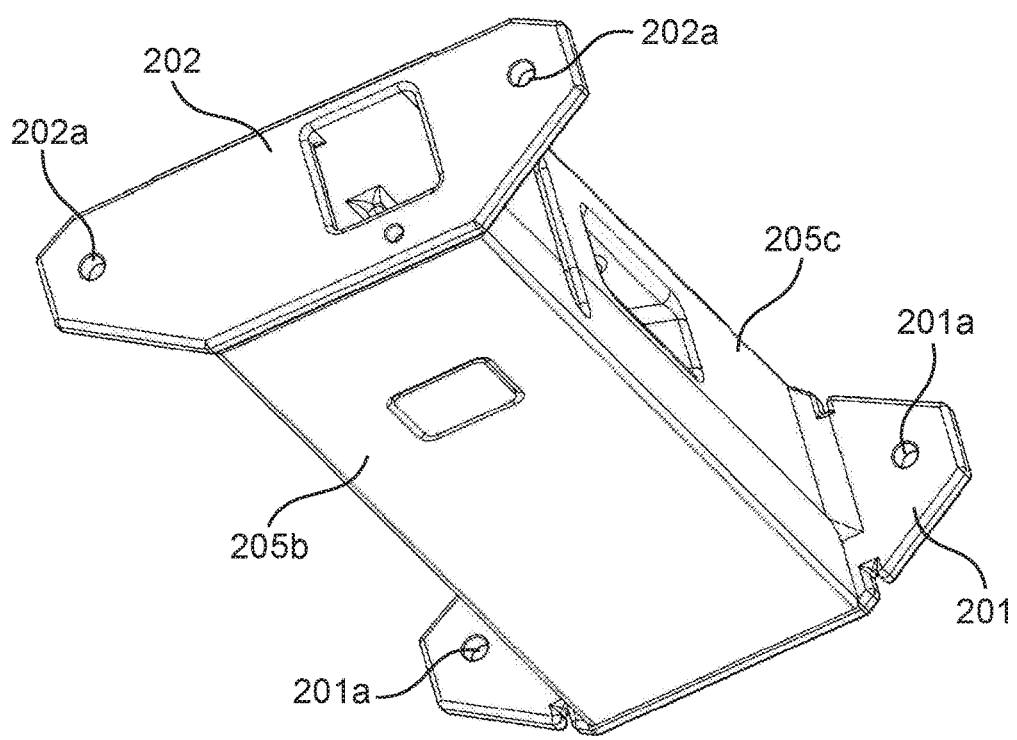

The main body portion 200 comprises housing surfaces to house and protect inner components of robot device 10 mounted therein and possibly house the aforementioned payloads to be carried. The housing surfaces typically comprise: top housing surface 205a shown in FIG. 1A and FIG. 2A; bottom housing surface 205b shown in FIG. 2B; and left housing surface 205c shown in FIGS. 1A, 2A and 2B (right housing surface is not shown in these figures but is similar to left housing surface 205c mutatis mutandis). The housing may optionally be in other shapes.

The main body portion 200 comprises a front (distal) surface 202 and a rear (proximal) surface 201. The front and rear surfaces 202 and 201 protrude sideways beyond the left and right housing surfaces. Each side protruding portion comprises an aperture—two front surface apertures 202a and two rear surface apertures 201a. Each front surface aperture 202a is parallel and aligned with its corresponding rear surface aperture 201a (right side with right side, left with left).

The two shafts 240 are placed, each between one front surface 202 side protruding portion and its corresponding rear surface 201 side protruding portion. Two rods 244 are placed each within a front surface aperture 202a and its corresponding rear surface aperture 201a. Each shaft 240 is mounted on its corresponding rod 244. Accordingly, the central longitudinal axis of rod 244 coincides with the line connecting the centers of apertures 201a and 202a, and coincides with the corresponding imaginary axis 250a or 250b.

When shaft 240 rotates the connected bars 106 and 105 and corresponding leg 300 rotate accordingly around rod 244 (around the corresponding imaginary axis 250a or 250b). The legs 300 and bars 106 and 105 indeed rotate around the corresponding axis (250a or 250b) but remain in the same position in the fore-aft direction, unless actuated by the FBEM motor (as will be explained in detail herein).

The sprawl mechanism causes the legs to move further apart or to come closer together (and thus elevate or lower the main body portion 200). When legs 300 engage the ground the sprawl power applied to move the legs must be greater than the friction forces between the legs 300 and the ground.

Figure 1B:
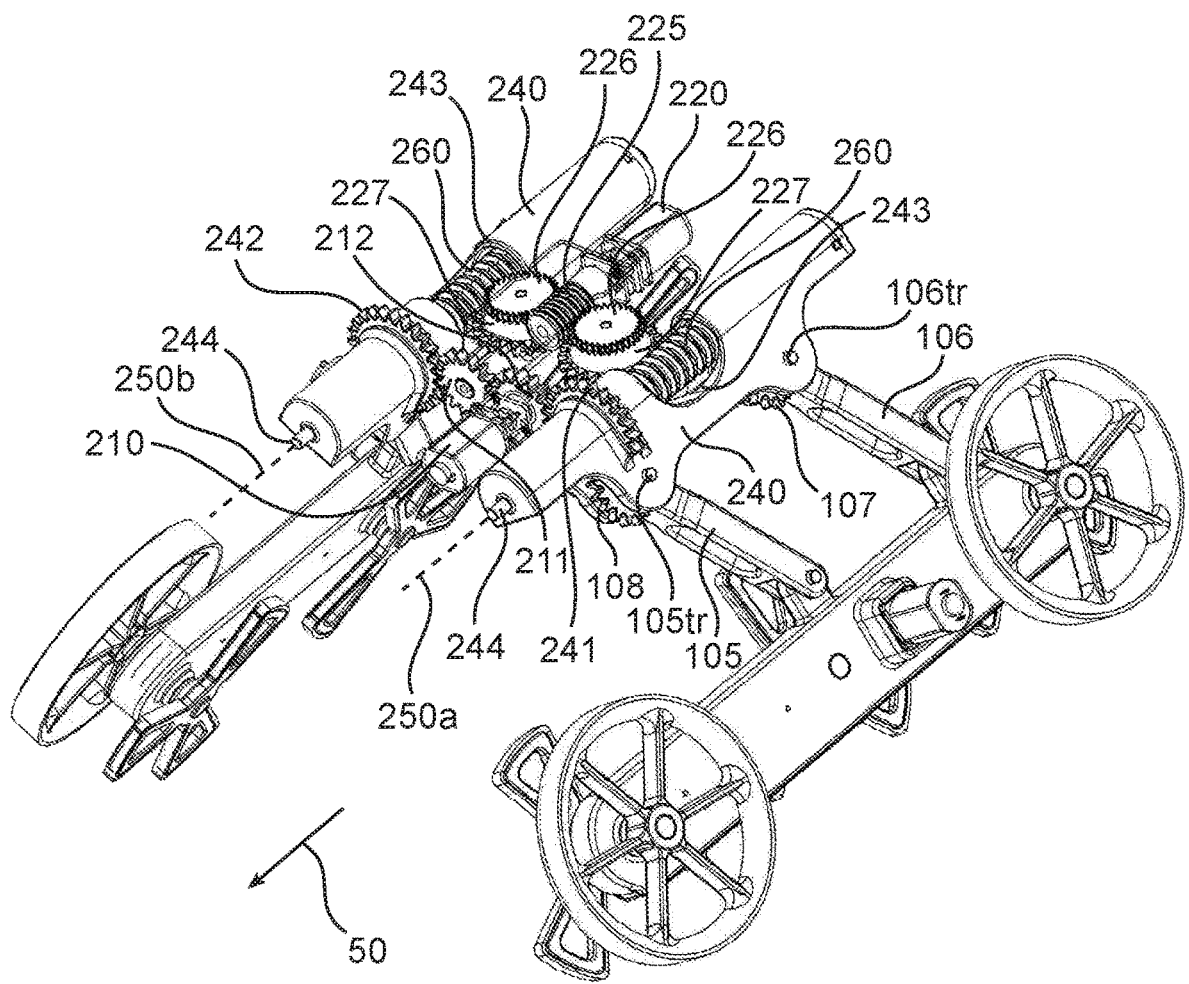
Figure 1C:
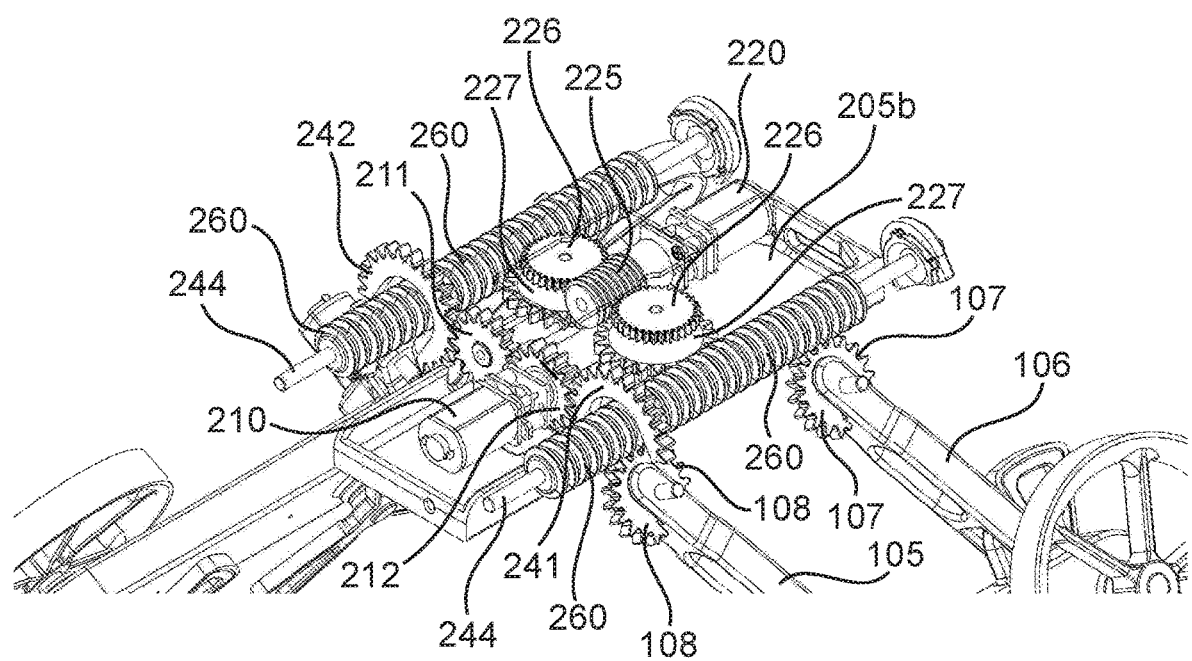

According to an embodiment of the present invention, the sprawl mechanism is carried out by a gear mechanism, shown in FIGS. 1B-1C. FIG. 1B shows a portion of the same robot device 10 as in FIG. 1A only without the main body portion housing (e.g. top-and-side covering and bottom covering), and FIG. 1C shows a portion of the same robot device 10 as shown in FIG. 1B only without the shafts 240 (but with bottom housing surface 205b).

FIG. 1B shows the sprawl motor 210 configured to generate rotational movement. The motor 210 is fixed within the housing (not shown). The motor 210 is configured to operate a gear system that applies the sprawl movement (also referred to herein as sprawl gear system). The motor 210 is configured to rotate a first spinning spur gear (cogwheel) element 212. The first spinning spur gear element 212 meshes with other spinning spur gears that cause the rotatable shafts 240 to rotate. FIG. 1B shows a particular embodiment where spinning spur gear element 212 meshes with spinning spur gear (cogwheel) element 211 (aligned with spur gear element 212 and its center is mounted on a pin such that it is configured to spin around said pin). The sprawl motor 210 is configured to rotate a rotatable axle (not shown) extending therefrom (in this particular embodiment extending proximally therefrom) wherein the spur gear 212 is mounted on and fixed to the axle (at the spur gear 212 center). The sprawl motor 210 is configured to cause rotation of the axle (and thus of the spur gear 212 mounted thereon and fixed thereto) in both directions (according to the command received from the controller unit). Typically, the axle is aligned parallel to the imaginary axes 250a and 250b.

The left rotatable shaft 240 (left when facing distally) comprises an arched shaped spur gear element 241 mounted thereon. The left rotatable shaft 240 is positioned such that the arched shaped spur gear element 241 meshes with spur gear 212. The right rotatable shaft 240 (right when facing distally) comprises an arched shaped spur gear element 242 mounted thereon. The right rotatable shaft 240 is positioned such that the arched shaped spur gear element 242 meshes with spur gear 211. Spur gear elements 241 and 242 each comprise teeth extending outwards therefrom such that are configured to mesh with spur gears 212 and 211 respectively. Thus spur gear 212 meshes with spur gear 211 on one side and spur gear element 241 on the other side. Thus also spur gear 211 meshes with spur gear 212 on one side and spur gear element 242 on the other side. All gear elements 242, 211, 212 and 241 are aligned.

When spur gear 212 is rotated by the sprawl motor 210 the meshing with spur gear element 241 causes the left rotatable shaft 240 (and thus its corresponding connected bars and leg 300) to rotate around axis 250a. Also, the meshing of spur gear 212 with spur gear 211 and meshing of spur gear 211 with right rotatable shaft 240 (and thus its corresponding connected bars and leg 300) to rotate around axis 250b.

When spur gear 212 is rotated counter clockwise (when facing distally) by the sprawl motor 210 the meshing with spur gear element 241 causes the left rotatable shaft 240 to rotate clockwise and thus its corresponding connected bars and leg 300 move upwards. Also, spur gear 211 is thus rotated clockwise and its meshing with spur gear element 242 causes the right rotatable shaft 240 to rotate counter-clockwise and thus its corresponding connected bars and leg 300 also move upwards in relation to main body portion 200. Accordingly, when spur gear 212 is rotated clockwise the bars and legs 300 (on both sides) move downwards in relation to main body portion 200. Thus the gear meshing of the gear elements 242, 211, 212 and 241 is such that the sprawl motor 210 either lifts both legs 300 at the same time (when activated in one direction) or lowers both legs 300 at the same time (when activated in the opposite direction). In other words, both sides of the robot are phased together and move symmetrically relative to its center. The sprawl motor 210 is actually configured to generate the gear system to cause the rotation of the rotatable shafts 240 in opposite directions (i.e. one rotates to a certain magnitude clockwise and the other rotates to the same magnitude (to the same extent) counterclockwise).

The sprawl mechanism may be carried out by other gear systems, e.g. a conical or spiral bevel or other gear system known in the art, mutatis mutandis.

Four-Bar Extension Mechanism (FBEM)

As mentioned hereinabove the FBEM on each side of the robot device 10 comprises two parallel bars—proximal bar 106 and distal bar 105 forming four joints 103a 103b, 103c and 103d.

According to an embodiment of the present invention, the distal bars 105 and 106 connect to main body portion 200 at shaft 240. The shaft 240 comprises two distal side apertures 248 that face each other, are parallel and aligned, and two proximal side apertures 249 that face each other, are parallel and aligned. Typically, apertures 248 are at a distal location along shaft 240 surrounded by two distal downward protruding portions 248p (e.g. protruding side surfaces). Typically, apertures 249 are at a proximal location along shaft 240 surrounded by two distal downward protruding portions 249p (e.g. protruding side surfaces).

FIGS. 4A-4C show an embodiment of the proximal bar 106 of the present invention. Proximal bar 106 comprises two top protruding parallel surfaces 106t. Each top protruding parallel surface 106t comprises an aperture 106ta. The apertures 106ta face each other and are parallel and aligned with one another. Proximal bar 106 comprises two bottom protruding parallel surfaces 106p. Each bottom protruding parallel surface 106b comprises an aperture 106ba. The apertures 106ba face each other and are parallel and aligned with one another.

The FBEM may comprise a rack and pinion arrangement. The proximal bar 106 is connected to a pinion element 107 configured to be part of a rack and pinion arrangement as will be explained hereinafter. The pinion 107 has the form of a majority of a typical pinion of a rack and pinion arrangement, only its bottom part (a recess 107r) is fixed to a top part of proximal bar 106. Typically, the recess 107r is fixed to a bar portion 106s (and complementary therewith) located between the protruding points in which the two top protruding parallel surfaces 106t begin to protrude. Typically, recess 107r has a rectangular form (and thus portion 106s has a rectangular form) such that when pinion 107 turns angularly the bar 106 turns angularly accordingly.

A portion of pinion 107 is placed between the two top protruding parallel surfaces 106t. The pinion 107 comprises a central aperture 107a. Central aperture 107a is parallel and aligned with apertures 106ta. A rod 106tr is inserted through proximal side apertures 249 (of shaft 240) and through apertures 106ta and through central aperture 107a. Thus pinion 107 (and bar 106 fixed thereto) form revolute (hinge) joint 103a with shaft 240 (side apertures 249), and may rotate in relation to rod 106tr.

It should be noted that proximal bar 106 (and pinion 107) is typically identical to distal bar 105 (and pinion 108 respectively) and for the sake of brevity and simplicity will not be explained in detail, wherein elements 106, 106t, 106ta, 106s, 106b, 106ba, 106tr, 107, 107a, 107r correspond to elements 105, 105t, 105ta, 105s, 105b, 105ba, 105tr, 108, 108a, 108r respectively, mutatis mutandis. Accordingly, pinion 108 fixed to bar 105 form revolute (hinge) joint 103d with shaft 240 (side apertures 248), and may rotate in relation to (i.e. around) rod 105tr. Pinions 107 and 108 rotate around the axes of joints 103a and 103d respectively (i.e. pinions 107 and 108 rotate around the same axes that joints 103a and 103d rotate around respectively).

Each elongated leg 300 comprises two upward protruding surface portions, distal upward protruding surface portion 301 and proximal upward protruding surface portion 302. Each of these upward protruding surface portions 301 and 302 each comprise an aperture 301a and 302a, respectively. Proximal upward protruding surface portion 302 is placed between the two bottom protruding parallel surfaces 106b.

Distal upward protruding surface portion 301 is placed between the two bottom protruding parallel surfaces 105b. Aperture 302a is parallel and aligned with apertures 106ta and aperture 301a is parallel and aligned with apertures 105ta. A rod 106br is inserted within apertures 106ba and aperture 302a, thus forming hinge joint 103b. A rod 105br is inserted within apertures 105ba and aperture 301a, thus forming hinge joint 103c.

FIGS. 1B and 1C show the FBEM motor 220 configured to generate rotational movement. The FBEM motor 220 is fixed within the housing (not shown). The FBEM motor 220 is configured to operate a gear system that applies the FBEM movement (also referred to herein as FBEM gear system). The FBEM motor 220 is configured to operate a gear system which comprises a worm drive arrangement. The FBEM motor 220 is configured to rotate worm screw 225 (in this case extending distally therefrom, e.g. the worm screw 225 is mounted on a rotatable axle (not shown) extending distally from the motor). Two side worm wheels 226 ("worm gears" used herein interchangeably) mesh with worm screw 225 at both of its sides.

The robot device comprises two side rack elements 260. The rack element may comprise a cylindrical body with evenly spaced apart ring portions along its length, forming the rack element 260. The ring portions form the "teeth" of the rack element 260 which mesh with teeth of an engaging pinion. In this manner, the rack 260 may engage and mesh with corresponding pinions, one at its side and one at its bottom. The spinning of side worm wheels 226 is configured to actuate robot device 10 side rack elements 260. The two side worm wheels 226 are each fixed to a bottom pinion 227 having a common central axis which they both rotate around. Due to the fact that a single worm wheels 226 is fixed on a single pinion 227 and both have a common central axis, they both spin at the same angular velocity. The bottom pinions 227 comprise central apertures (not shown) typically each mounted on a pin (not shown) extending upwards from bottom housing surface 205b, such that pinions 227 are fixed and spinnable thereon. The present invention worm wheels 226 and pinions 227 might be described as a worm gear element (there are actually two worm gear elements on the sides of worm screw 225) that comprises a top portion (226) that meshes with worm screw 225; and a bottom portion (227) that meshes with its corresponding side rack element 260. Thus the worm gear element (226 with 227) also acts as a pinion to its corresponding rack element 260.

Each pinion 227 engages a corresponding side rack 260 on its outer side (the side opposite from the side near worm screw 225) and meshes therewith. The robot device 10 comprises two side racks 260 each of them placed in the fore-aft direction. According to this embodiment the shafts 240 are hollow. Each rack 260 is placed within its corresponding hollow shaft 240 (as shown in FIGS. 1A-1B). FIG. 1C shows the rack 260 without the shaft 240. Each rack 260 is mounted on its corresponding rod 244 and movable in the distal and proximal directions thereon. The shaft 240 hollow interior is typically sufficiently big enough in order to enable rack 260 to move without functional interference.

Each hollow shaft 240 comprises a central opening 243 such that a central portion of rack 260 (within said shaft 240) can freely mesh with its corresponding pinion 227. In the present set of figures, the opening 243 is such that the whole central portion of rack 260 can be engageable from outside the shaft 240. It should be noted that in other arrangements with other small structural adaptations, a common single worm wheel/pinion may also engage and mesh with both the side pinion 260 and with the worm screw 225 (such that the spinning of one of them causes the spinning of the others).

At least portions of the bottom of hollow shaft 240 are open. In FIG. 3C it is shown that almost all of the bottom of shaft 240 is open. These open portions at least include the areas where pinions 107 and 108 are located and rotatable therein. Pinions 107 and 108 are placed (typically underneath rack 260) in a manner such that they mesh with rack 260.

When motor 220 is activated, it spins worm screw 225, which rotates worm wheels 226 (in a worm drive manner). Pinions 227 (fixed thereto) rotate accordingly and each cause its corresponding rack 260 to rotate (in a rack and pinion manner). The racks 260 linear movement cause the pinions 107 and 108 to rotate (in a rack and pinion manner). The pinions 107 and 108 push the proximal and distal bars accordingly.

For example, when viewing in the distal direction (and from a top-perspective view), if the motor 220 spins the worm screw 225 clockwise, this causes the worm wheel 226 on its left to rotate clockwise and the worm wheel 226 on its right to rotate counterclockwise. Pinions 227 rotate accordingly. The left pinion 227 causes the left rack 260 to move distally and the right pinion 227 causes the right rack 260 to also move distally. Thus the motor 220 causes the racks 260 to both move in the same direction. Because the shaft-legs arrangement are the same, each rack 260 causes its corresponding meshing pinions 107 and 108 to spin forward (with the teeth on the upper side traveling distally) thus pushing the bars 105 and 106 (and thus both legs 300) proximally. If the motor 220 spins the worm screw 225 counterclockwise, the legs 300 accordingly move distally.

Figure 1D:
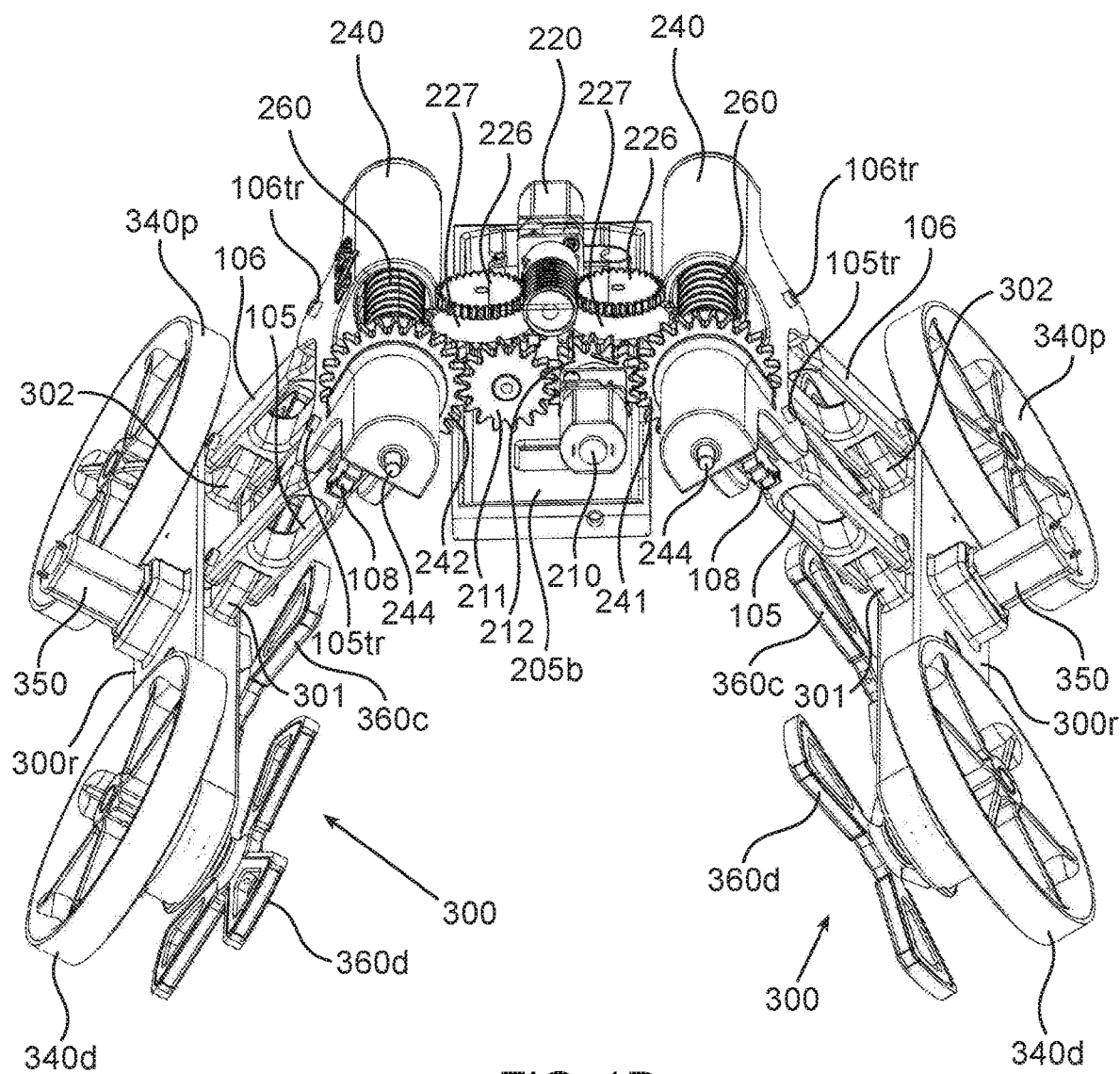

It should be noted that the FBEM functions irrespective of the sprawl mechanism and vice versa. Each mechanism functions independently on its own according to its corresponding motor activation. For example, the shaft 240 may rotate (sprawl mechanism) and at the same time the legs may move distally/proximally (FBEM). Even when shaft 240 rotates, rack 260 stays engageable to pinion 227. FIG. 1D shows a perspective view of robot 10 from a front position.

According to another embodiment of the present invention, the rack and pinion arrangement is replaced by a worm gear arrangement. In this embodiment side worm screws (not shown) replace the side racks 260. The pinions 107 and 108 are replaced with appropriate worm wheels (not shown) that have appropriate teeth that mesh with the corresponding side worm screws. For the sake of brevity, the worm wheels will not be explained in detail since they are similar to the pinions 107 and 108 with teeth configured to mesh with the side worm screws (e.g. same recess, apertures, rods, same fixation to bars 105, 106, etc., mutatis mutandis). Proximal bar 106 is connected to the worm wheel configured to be part of a worm drive arrangement. Thus worm wheel (and bar 106 fixed thereto) form revolute (hinge) joint 103a with shaft 240 (side apertures 249), and may rotate in relation to rod 106tr.

It should be noted that proximal bar 106 (and corresponding worm wheel) is typically identical to distal bar 105 (and corresponding worm wheel respectively) and for the sake of brevity and simplicity will not be explained in detail, as mentioned above regarding the rack and pinion embodiment. The worm wheel fixed to bar 105 form revolute (hinge) joint 103d with shaft 240 (side apertures 248), and may rotate in relation to rod 105tr. The worm wheels fixed to the bars rotate around the axes of joints 103a and 103d respectively (i.e. the worm wheels fixed to the bars rotate around the same axes that joints 103a and 103d rotate around respectively).

The spinning of side worm wheels 226 is configured to actuate robot device 10 side worm screws. The two side worm wheels 226 are each fixed to a bottom worm wheel (not shown but resemble pinion 227) having a common central axis which they both rotate around. Due to the fact that a single worm wheels 226 is fixed on a single worm wheel and both have a common central axis, they both spin at the same angular velocity. The bottom worm wheels comprise central apertures (not shown) typically each mounted on a pin (not shown) extending upwards from bottom housing surface 205b, such that bottom worm wheels are fixed and spinnable thereon.

The present invention worm wheels 226 and bottom worm wheels might be described as a worm gear element (there are actually two worm gear elements on the sides of worm screw 225) that comprises a top portion (226) that meshes with worm screw 225; and a bottom portion (resembling pinion 227) that meshes with its corresponding side worm screw 260.

Each bottom worm wheel engages a corresponding side worm screw on its outer side (the side opposite from the side near worm screw 225) and meshes therewith (the teeth of the bottom worm wheels in this embodiment are configured to mesh with the side worm screws). The two side worm screws are each placed in the fore-aft direction. Each side worm screw is placed within its corresponding hollow shaft 240. Each side worm screw is mounted on its corresponding rod 244 and rotatable thereon. The shaft 240 hollow interior is typically sufficiently big enough in order to enable the side worm screw to spin without functional interference.

Each hollow shaft 240 comprises a central opening 243 such that a central portion of the side worm screw (within said shaft 240) can freely mesh with its corresponding bottom worm wheel. The opening 243 is such that the whole central portion of the side worm screw can be engageable from outside the shaft 240. It should be noted that in other arrangements with other small structural adaptations, the worm wheel 226 may also engage and mesh with the side worm screw.

At least portions of the bottom of shaft 240 are open. These open portions at least include the areas where the worm wheels fixed to the bars are located and rotatable therein. The worm wheels fixed to the bars are placed such that they mesh with their corresponding side worm screw.

When motor 220 is activated, it spins worm screw 225, which rotates worm wheels 226 (in a worm drive manner). The bottom worm wheels 227 (fixed thereto) rotate accordingly and each cause its corresponding side worm screw to rotate (in a worm drive manner). The side worm screws rotate and cause the worm wheels fixed to the bars to rotate (in a worm drive manner). The worm wheels fixed to the bars push the proximal and distal bars accordingly.

For example, when viewing in the distal direction (and from a top-perspective view), if the motor 220 spins the worm screw 225 clockwise, this causes the worm wheel 226 on its left to rotate clockwise and the worm wheel 226 on its right to rotate counterclockwise. The bottom worm wheels rotate accordingly. The left bottom worm wheel causes the left side worm screw (not shown) to rotate counterclockwise and the right bottom worm wheel causes the right side worm screw (not shown) to also rotate counterclockwise. Thus the motor 220 causes the side worm screws to both rotate in the same direction. Because the shaft-legs arrangement are the same, each side worm screw causes its corresponding worm wheels fixed to the bars to spin forward (with the teeth on the upper side traveling distally) thus pushing the bars 105 and 106 (and thus both legs 300) proximally. If the motor 220 spins the worm screw 225 counterclockwise, the legs 300 accordingly move distally.

It should be noted that the FBEM functions irrespective of sprawl mechanism and vice versa. Each mechanism functions independently on its own according to its corresponding motor activation. For example, the shaft 240 may rotate (sprawl mechanism) and at the same time the legs may move distally/proximally (FBEM). Even when shaft 240 rotates, the side worm screw stays engageable to the bottom worm wheel.

Elongated Leg 300

FIGS. 5A-5D show a view of a single elongated leg 300 according to an embodiment of the present invention. Each elongated leg 300 comprises a pair of parallel ribs 300r with a gear arrangement 310 therebetween. The elongated leg 300 further typically comprises top and bottom surfaces and front and rear surfaces (in FIG. 5A leg 300 is shown as elliptic). Each elongated leg comprises a motor 350 for actuating the gear system 310 and thus the wheel and/or spoked wheels (explained hereinbelow). Each elongated leg 300 motor 350 is typically attached to the elongated leg outer side rib 300r (both motors 350 shown in FIG. 1D as extending outwards/sideways). Thus, robot device 10 comprises four motors, the sprawl motor 210 configured to actuate the sprawl mechanism, the FBEM motor 220 configured to actuate the FBEM, and the two leg motors 350.

The leg motor 350 is configured to rotate a rotatable axle 318 (shown in FIG. 5C) extending therefrom (in this particular embodiment extending inwards protruding rib 300r) wherein a foremost leg spur gear 325 is mounted on and fixed to the axle 318 (at the foremost leg spur gear 325 center). Thus, the motor 350 is configured to causes the axle 318 (and thus foremost spur gear 325) to rotate. The leg 300 comprises a plurality of adjacent meshing spur gears (typically placed along the elongated leg 300).

Figure 5A:
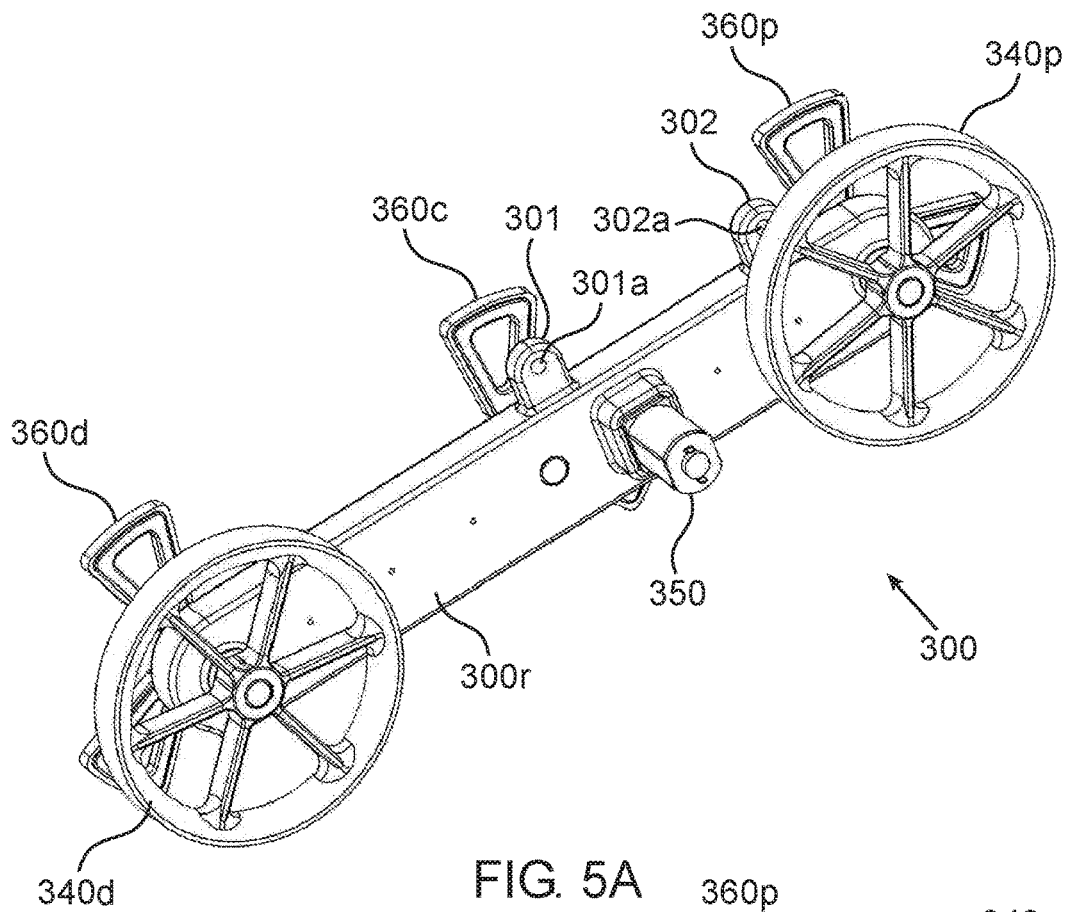
FIGS. 5A-5D illustrate the robot leg according to an embodiment of the present invention.
Figure 5B:
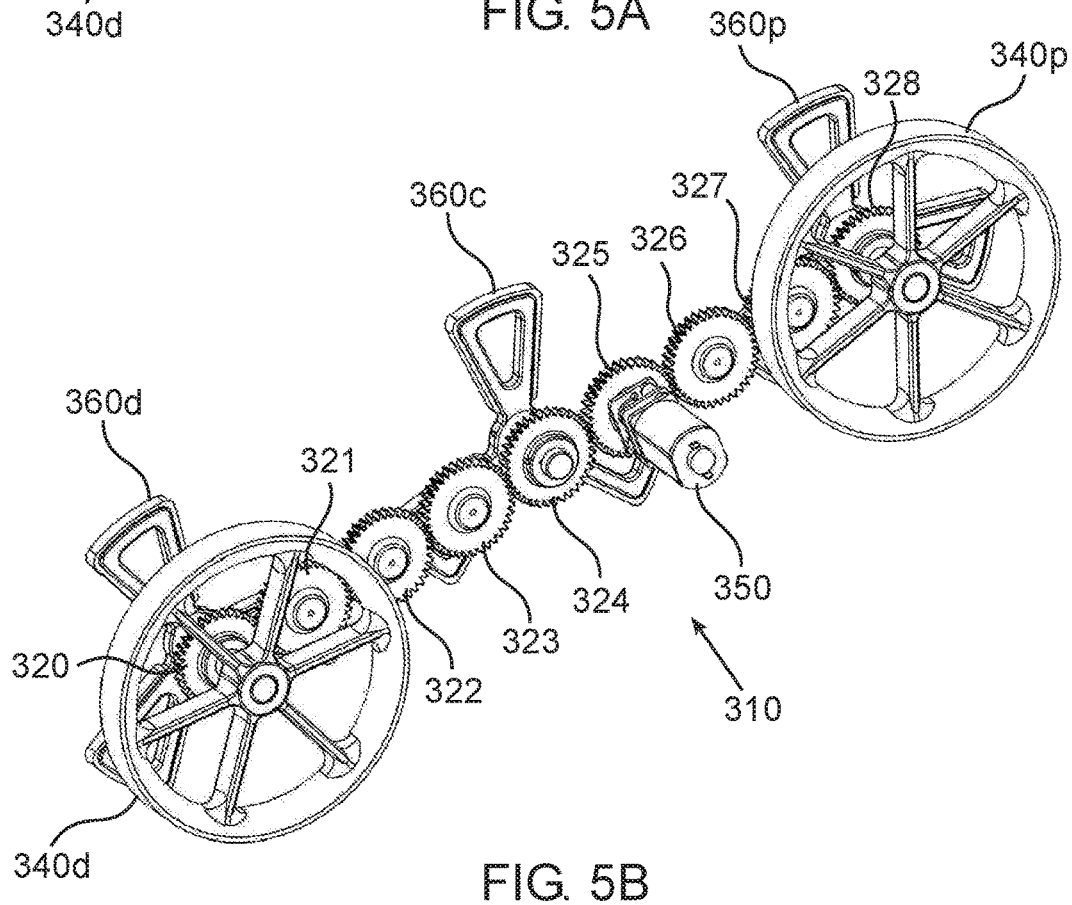
Figure 5C:
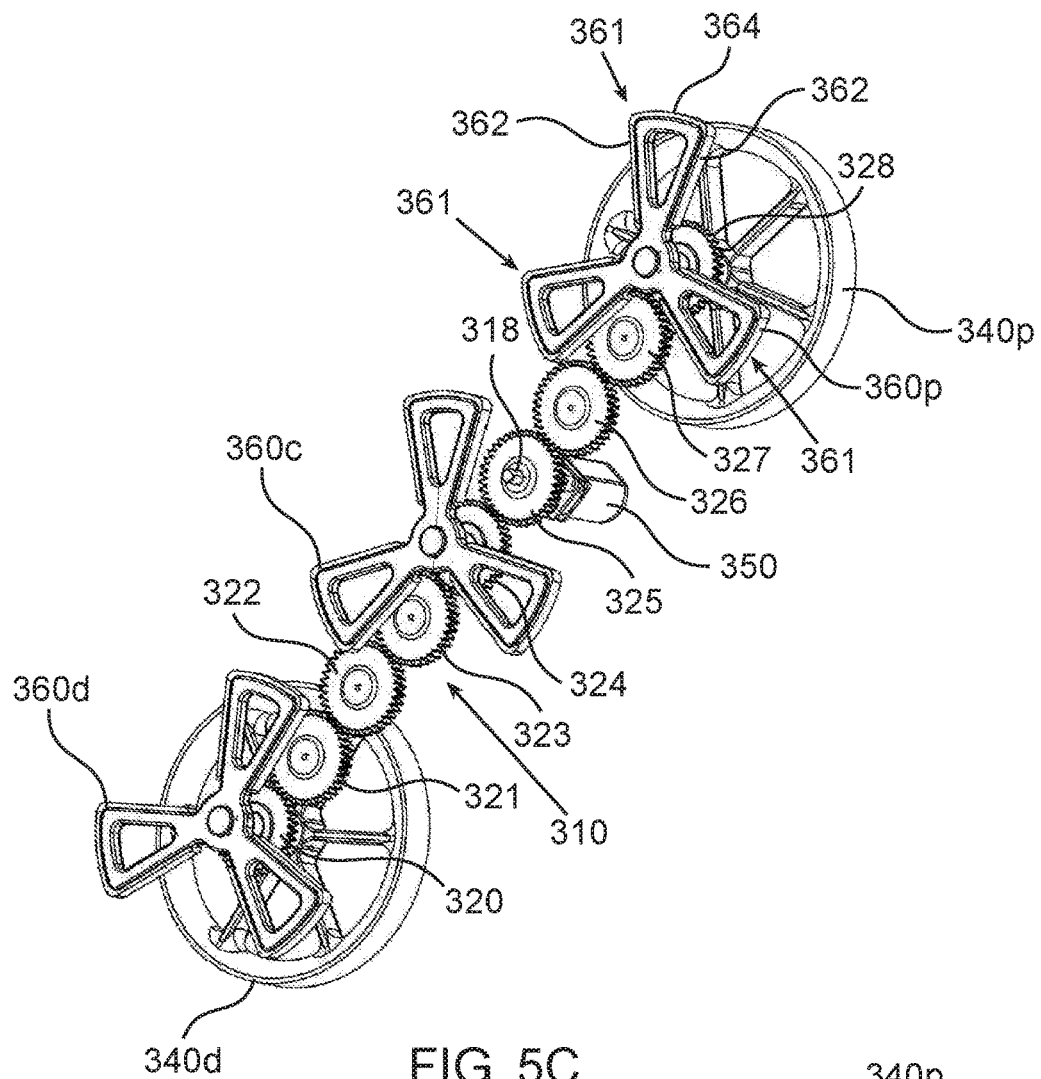

Foremost spur gear 325 is aligned with a plurality of spur gears as follows (wherein each two adjacent spur gears mesh one with the other), some of which are fixed to the wheels and/or spoked wheels. FIG. 5B shows the gear arrangement 310 of leg 300 without the ribs 300r and without the upward protruding surface portions 301 and 302. The foremost spur gear 325 meshes with a spur gear 326 at its proximal end. Spur gear 326 meshes with a spur gear 327 at its proximal end. Spur gear 327 meshes with a spur gear 328 at its proximal end. Spur gear 328 is fixed to proximal wheel 340p on the leg 300 outer side and to proximal spoked wheel 360p on the leg 300 inner side (wherein the centers of spur gear 328, proximal wheel 340p and proximal spoked wheel 360p are all mounted on and fixed to a common axle (not shown)).

Figure 5D:
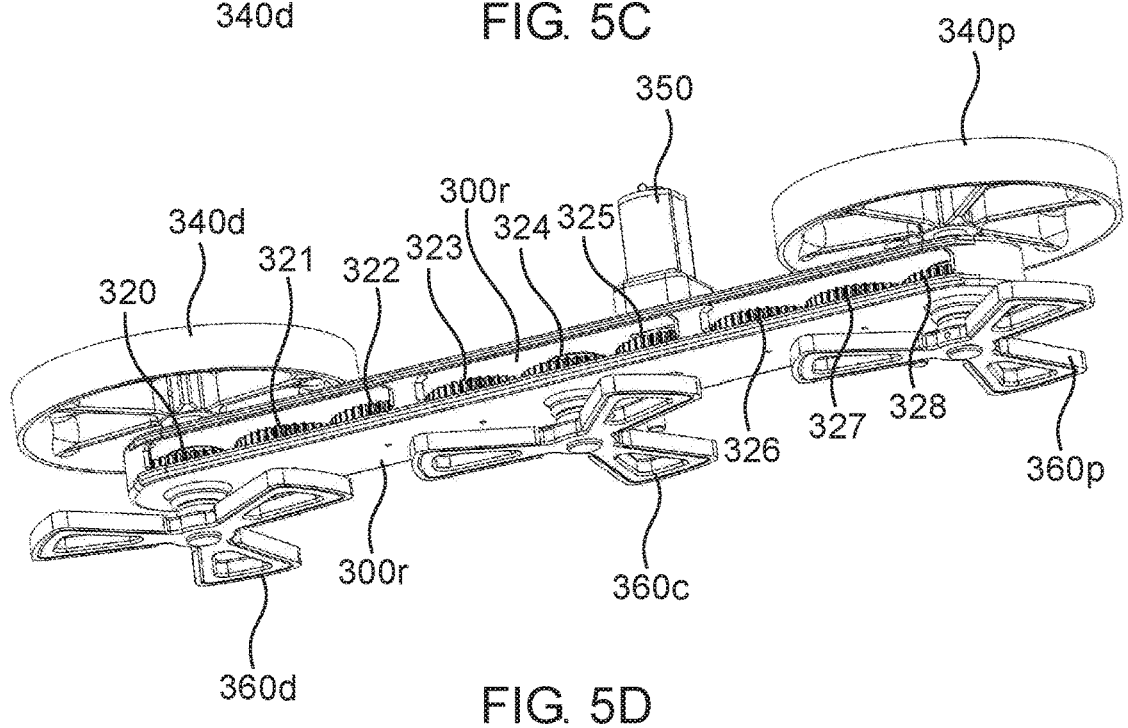

The foremost spur gear 325 meshes with a spur gear 324 at its distal end. Spur gear 324 is fixed to central spoked wheel 360c on leg 300 inner side (towards main body portion 200, wherein the centers of spur gear 324 and central spoked wheel 360c are mounted on and fixed to a common axle (not shown)). Spur gear 324 meshes with a spur gear 323 at its distal end. Spur gear 323 meshes with a spur gear 322 at its distal end. Spur gear 322 meshes with a spur gear 321 at its distal end. Spur gear 321 meshes with a spur gear 320 at its distal end. Spur gear 320 is fixed to distal wheel 340d on the leg 300 outer side and to distal spoked wheel 360d on the leg 300 inner side (wherein the centers of spur gear 320, distal wheel 340d and distal spoked wheel 360d are all mounted on and fixed to a common axle (not shown)). FIG. 5D shows the parallel ribs 300r and the gear arrangement 310 therebetween (without the leg 300 top/bottom surface).

When facing inwards (e.g. FIG. 5B), when the motor 350 rotates foremost spur gear 325 clockwise, then gear 326 rotates counterclockwise causing gear 327 to rotate clockwise causing gear 328 to rotate counterclockwise (thus causing proximal wheel 340p and proximal spoked wheel 360p to rotate counterclockwise—thus driving robot 10 distally). Also, when the motor 350 rotates foremost spur gear 325 clockwise, then gear 324 rotates counterclockwise (thus causing central spoked wheel 360c to rotate counterclockwise—thus driving robot 10 distally). Also, when the motor 350 rotates foremost spur gear 325 clockwise, then gear 324 rotates counterclockwise causing gear 323 to rotate clockwise causing gear 322 to rotate counterclockwise causing gear 321 to rotate clockwise causing gear 320 to rotate counterclockwise (thus causing distal wheel 340d and distal spoked wheel 360d to rotate counterclockwise—thus driving robot 10 distally). Accordingly, when the motor 350 rotates foremost spur gear 325 counterclockwise, all the wheels/spoked wheels rotate clockwise causing robot device 10 to move proximally.

Typically, the spur gears must be arranged such that all wheels when rotated, rotate in the same direction. Therefore, in this arrangement two different spur gears, each fixed to a wheel must have an odd number of meshing spur gears therebetween.

Of course, the leg gear arrangement 310 may be carried out with more or less spur gears (or optionally with other types of gear arrangements), and with more or less wheels/spoked wheels connected (and optionally placed at different locations along elongated legs 300). Also, some embodiments may not comprise the wheels and some may not comprise the spoked wheels, mutatis mutandis.

The spoked wheels 360p, 360c and 360d each comprise:
  a central aperture (not shown) configured to be mounted on an axle (not shown);
  N sectors 361 (shown in FIG. 5C), each bounded by two arms 362 extending outwards (from a ring portion 363 surrounding the central aperture) and an arc portion 364 lying between the outer ends of the arms 362.

Preferably, each sector 361 is evenly spaced apart one from the other (e.g. evenly radially spaced apart from one another). Preferably, N=3.

The robot device 10 comprises a controller (typically placed within the main body portion 200) connected to (e.g. coupled to) the four motors and configured to activate them. The controller is connected to a receiver configured to receive remote-control instructions to operate the motors in a desired manner. The remote-controller (e.g. a joystick) comprises a transmitter and may transmit instructions to motor 210 to alter the sprawl angle (e.g. to increase or decrease); to motor 220 to alter the leg 300 position in the FBEM (e.g. forward or backwards); to motor 350 to activate the left or right (or both) leg 300 wheels (driving forward or backwards); and possibly to steer the robot device 10 (e.g. rightwards or leftwards by using a possible steering system that the distal and/or proximal wheels/spoked wheels are connected to). The device 10 may perform more that one task at the same time according to the instructions given (e.g. activating at the same time—the sprawl mechanism, the wheels, the FBEM, the steering, etc.). The remote-controller can be operated by a human operator. Optionally, the commands may be given by using a dedicated microcontroller.

The remote-control transmission may be carried out by several techniques, e.g. RF, WIFI, Bluetooth, etc. In some embodiments the controller may remotely directly transmit instructions to the motors by said transmission techniques (in which case each motor would comprise or be connected to an appropriate receiver), i.e. transmit instructions directly to the motor receivers.

The robot device 10 comprises a power source (e.g. one or more batteries), typically placed within the main body portion 200, configured to power all of the motors in the robot device 10 (and the receiver and controller). For example, the robot device 10 is powered with two 3.7 Volts 800 mAh LiPo batteries connected in series.

Figure 6A:
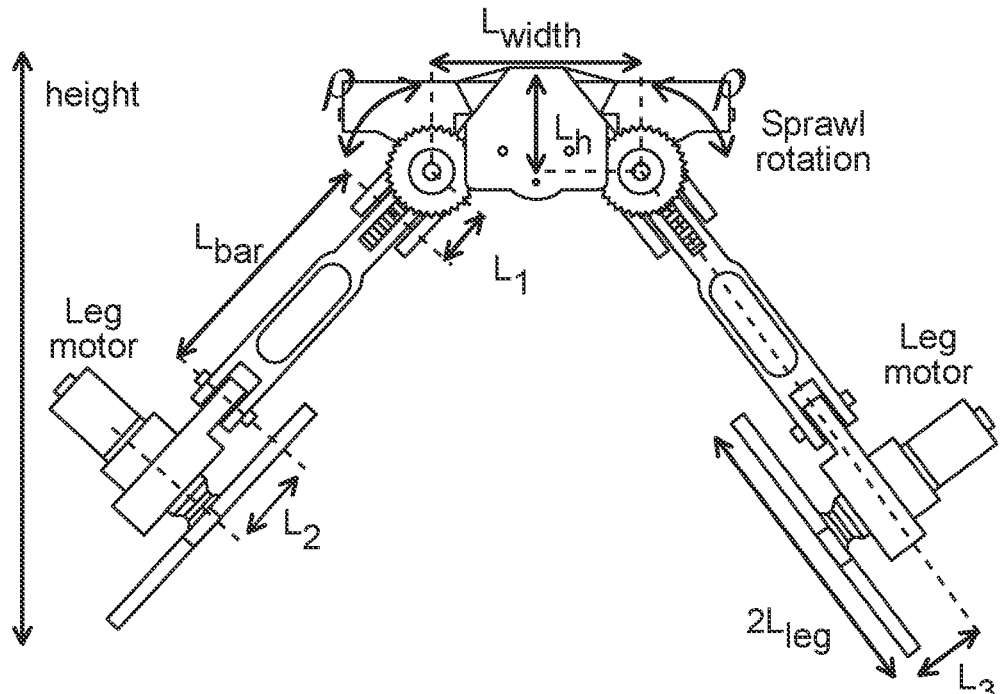
FIG. 6A shows the rotation angle of the sprawl mechanism.
Figure 6B:
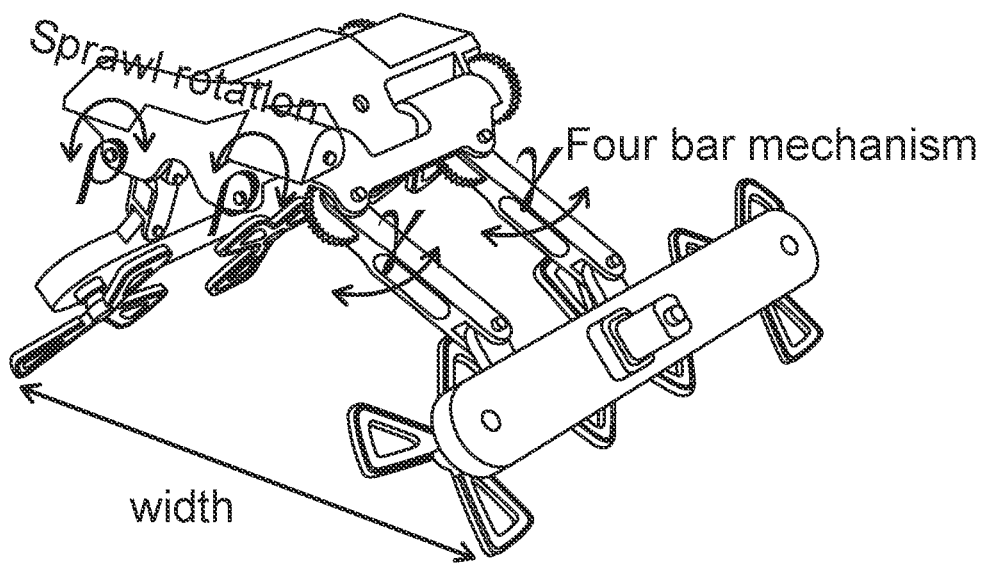
FIG. 6B shows the rotation angle of the FBEM.
Figure 7A:
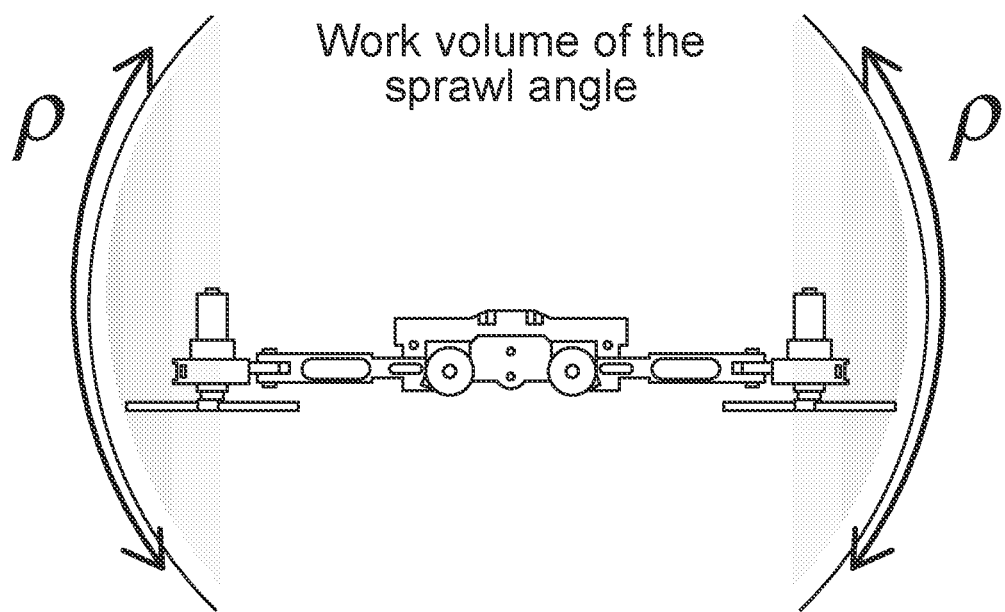
FIG. 7A is a front view showing the work volume of the sprawl angle.

The relative angle between the legs and the main body, as presented in FIGS. 6A, 6B, and 7A, forms the sprawl angle $\rho$, which is defined as $\rho=0$ when the legs are coplanar with the ground (the positive sense of the sprawl angle is downwards). The sprawl angles at both sides are actuated symmetrically through a single motor and mechanism to insure an identical sprawl on both sides.

The sprawl angle may be varied (for example in the range [−63°, 90°], wherein the positive sense of the sprawl angle is downwards), allowing the robot to continue running in the same direction even when upside down. The use of worm gears in the sprawl mechanism may contribute to high torque ratio and self-locking when inactivated. Optionally, each of the worm gears on the two sides is rotated using a conical gear setup that ensures equal rotational speed but different rotational direction (the directions explained hereinabove). For example, the worm gears may provide a 30:1 gear ratio.

The worm dives and the spur gears explained hereinabove may be changed with other gear elements that carry out the sprawl and for-bar motions. For example, a conical gear output of a motor may be used such that it ensures that two side worm gears that mesh with it rotate at identical rates but in opposite directions.

The FBEM is attached to the sprawl mechanism and rotates together with it. The two parallel bars 105 and 106 of the FBEM that connect the sprawl mechanism to the set of the legs have an identical length indicated as $L_{bar}$ and are synchronized to rotate at the same speed using the concentric worm gears (being identical) that mesh with the same worm screw. The rotation angle of the FBEM is denoted by $\gamma$ and can be varied (see FIGS. 6A, 6B and 7B), for example from +72° to −72°. The rotation angle $\gamma$ is zero when the two bars are perpendicular to the body and the legs. Both FBEMs (one on each side of the robot device) are actuated using the same motor and are symmetric relative to the body. The use of worm gears in the FBEM may contribute to high gear ratio and self-locking when not activated.

Figure 7B:
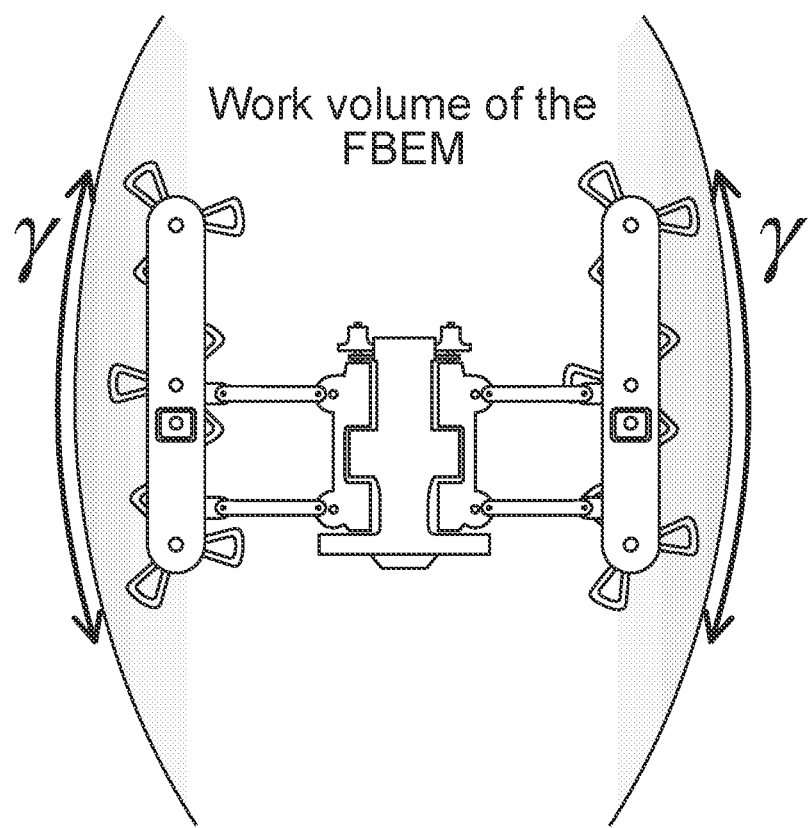
FIG. 7B is a top view showing the work volume of the FBEM.

FIGS. 7A-7B show the work volume of the legs of robot device 10 that constitutes a two-dimensional shell. FIG. 7A is a front view showing the work volume of the sprawl angle. FIG. 7B is a top view showing the work volume of the FBEM.

An example of the motors used (e.g. the sprawl motor(s), the FBEM motor(s), the leg motors) are 12 mm diameter off-the-shelf motors (6-9 volts manufactured by Pololulu that are available with encoders which can be purchased at different gear ratios). The gearboxes with different gear ratios are of the same size, which simplifies their replacement without having to modify any other parts. A model example of a motor number—100:1 HP 6V.

Each set of legs is driven by a single motor, for example, for higher speeds a lower gear ratio of 1:100 is used, and for climbing (as will be presented hereinbelow) a gear ratio of 1:300 is used, providing a torque of 0.18 Nm and 0.5 Nm respectively. The high ratio ensures high torque output and steady velocity.

In order to control the linear speed and the yaw rate of the robot 10, for example, an off-the-shelf programmable Teensy 3.2 controller (32 bit, 72 MHz and compatible with Arduino libraries) may be used. The steering control of the robot is achieved, for example, using a differential leg drive in closed loop PID control with MEMS gyros. Optionally, the rotational speed of the legs/wheels may be measured using optical encoders directly fitted to the shaft of the motors that provide between 1000 to 3000 counts per wheel revolution depending on the gear ratio of the motor (10 counts per motor revolution). Also, magnetic encoders which give for example, 10 to 20 counts per revolution may be used. Also, magnetic encoders which directly give the angle of rotation may be used.

In some embodiments, the automated control using the Teensy controller is limited to steering and speed control, wherein the sprawl mechanism and FBEM are actuated by a human operator. Embodiments may include such that any one of the motors can be operated by a human operator (remote-control) or by a controller.

In some embodiments a controller with a 2.4 GHz RC digital controller is used. In some embodiments the robot directly communicates with the micro controller. In one embodiment, a combined together human/autonomous controller may be used, wherein it typically takes a short time (e.g. only a few minutes) to change the controllers (for example, to switch from a human controller to an autonomous micro controller).

Figure 8:
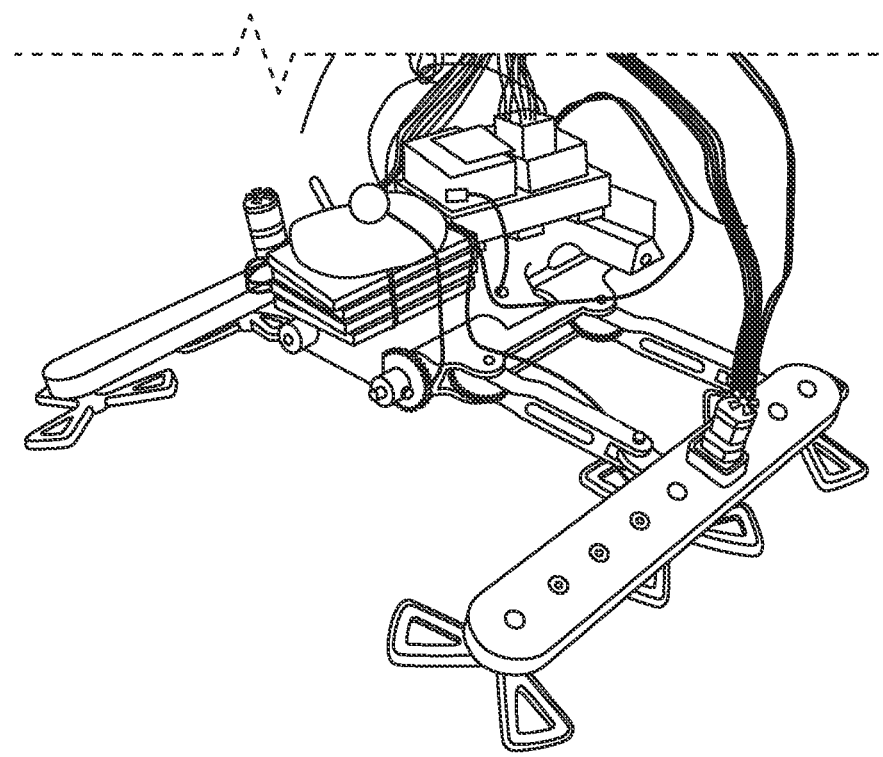
FIG. 8 shows an example of robot with a controller according to an embodiment of the present invention.

FIG. 8 shows an example where the robot is controlled using a Teensy 3.2 controller and 6 DOF IMU sensors in a closed control loop. In other embodiments this control setup can easily be replaced with an RC setup for humanly controlled operation.

According to another aspect of the present invention (not shown) the distance between the first joint 103*a* and second joint 103*b* may not be equal to the distance between the third joint 103*c* and fourth joint 103*d*. Also, the distance between the first joint 103*a* and fourth joint 103*d* may not be equal to the distance between the second joint 103*b* and third joint 103*c*. The distal bar may be a different length than the proximal bar. The bar connecting the first joint 103*a* and second joint 103*b* may not be parallel to the bar connecting the third joint 103*c* and fourth joint 103*d*. Also, the line connecting the first joint 103*a* and fourth joint 103*d* may not be parallel to the line connecting the second joint 103*b* and third joint 103*c*. Also, the distances between the joints on one side of the robot device may be different than the corresponding distances between the joints on the other side of the robot (for certain applications). However, in some embodiments it would be advantageous that the distances between the joints on one side of the robot device be the same as the corresponding distances between the joints on the other side of the robot.

According to this aspect of the present invention, there could be certain advantages. For example if the bars are not equal in size (the distance between the first and second joints is different than the distance between the third and fourth joints), then when applying the FBEM (from an initial mode where all wheels engage the surface they travel on) the distal wheels (for example) may be lifted in the air and only the proximal wheels engage the surface. This may resemble (intuitively) a motorcycle driver lifting his front wheel. This may contribute to maneuvering over obstacles.

According to another aspect of the present invention (not shown) the sprawl mechanism may be such that the shafts (and thus the bars (connected to the legs) connected thereto) do not necessarily rotate to the same extent in opposite directions. The shafts may rotate in the same direction. The shafts may rotate at different speeds (in the same direction or in opposite directions). Possibly only one shaft may be actuated to rotate while the other stays stationary. For this aspect of the present invention, each shaft may be driven by a single motor (with a corresponding independent gear system for each single motor-shaft actuation). In other words, the robot device may comprise a first sprawl motor, a first sprawl gear system, a second sprawl motor and a second sprawl gear system, wherein said first sprawl motor is configured to generate said first sprawl gear system to cause one of the shafts to rotate; and wherein said second sprawl motor is configured to generate said second sprawl gear system to cause the other shaft to rotate (e.g. each sprawl motor and corresponding gear system being similar to the sprawl motor and gear system explained hereinabove regarding the single sprawl motor embodiment mutatis mutandis).

This aspect may be advantageous for passing certain obstacles and for locomotion in complicated shaped areas (e.g. a slender passage on one side of the robot device). Thus, each individual leg's position may be adapted to a desired position in order for it to pass through a complicated area (where said desired positions enable passage therethrough).

According to another aspect of the present invention (not shown) the FBEM may be such that the robot legs do not necessarily move together (distally or proximally) to the same extent in the same direction. The legs may advance in different directions, or in the same direction at different speeds, etc. Possibly only one leg may advance while the other stays stationary. For this aspect of the present invention, each leg may be driven by a single motor (with a corresponding independent gear system for each single motor FBEM actuation). In other words, the robot device may comprise a first FBEM motor, a first FBEM gear system, a second FBEM motor and a second FBEM gear system, wherein said first FBEM motor is configured to generate said first FBEM gear system to cause one of the legs to move (to advance distally or proximally); and wherein said second FBEM motor is configured to generate said second FBEM gear system to cause the other leg to move (to advance distally or proximally). For example, each FBEM motor and corresponding gear system being similar to the FBEM motor and gear system explained hereinabove regarding the single FBEM motor embodiment mutatis mutandis).

This aspect may be advantageous for maneuvering in complicated shaped areas. Thus, each individual leg's position may be adapted (distally or proximally) to a desired position in order for it to pass through a complicated area (where said desired positions enable passage therethrough).

Manufacturing

According to an embodiment of the present invention the robot device 10 mechanical parts are manufactured using 3D printing. For example, an Objet Connex 350 3D printer whose accuracy is roughly 0.05 mm is used. An example of the material type is VeroWhite RGD 835. Easy part replacement (such as the bars of the FBEM, the spoke legs and wheels) may contribute to the function in different conditions and in case components are damaged during risky maneuvers. Optionally, the design of the device is such that it is easy to take the motors and other electronic elements out of the robot and replace them.

The following elements may be manufactured by 3D printing: the main body portion 200 surfaces, the shafts 240, all of the worm wheels and spur gear elements (226, 227, 241, 242, 107, 212, 211, 320-328), the worm screws 260, 225, the rods 106tr, 106br, 105tr, 105br, 244, bars 105, 106, ribs 300r and other leg surfaces, wheels (340p and 340d), spoke wheels (360p, 360c and 360d) and axles, all of which are described herein. Alternatively, these elements may be manufactured differently and may comprise plastics, metals, etc. These elements may range in size from a millimeter scale to a meter scale. Thus, the present invention may provide very small robots, medium sized robots and up to very large sized robots. Also, the weight of the present invention may vary (e.g. advantageous lightweight).

A particular example of a robot according to one embodiment of the present invention is such that the characteristic length of the robot is 15 cm and has a weight of 308 grams including the battery and control board for either human control or autonomous operation.

The unique structure of the present invention robot device provides various maneuvering advantages. Several experiments were conducted on the robot device 10. The robot device 10 was tested when running over different surface conditions, executing various maneuvers which included crawling over obstacles, climbing between two walls, and demonstrating the turtle locomotion gait in which the robot device 10 can move without rotating its legs. The experiments show its unique advantages.

Experiment 1—Horizontal Controlled Running

Figure 9:
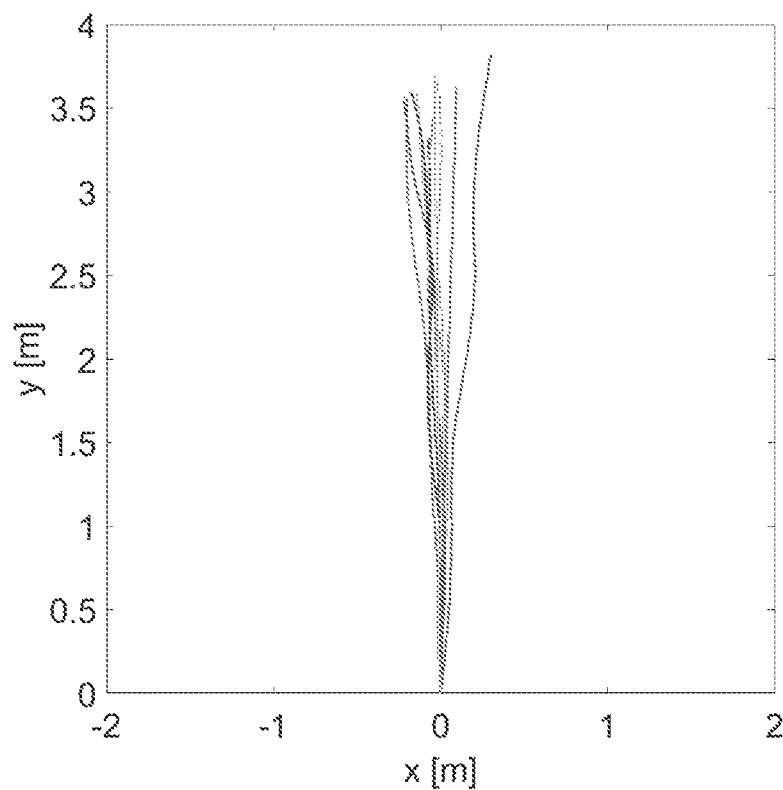
FIG. 9 presents the results of the paths of 10 runs that were recorded using an Optitrack tracking system setup.

Multiple runs with the Teensy controller were performed and it was found that the PID controller in a closed loop with the gyros was able to keep the robot in a straight line. In the experiments a 100:1 gear ratio was used which allows the robot to run at a maximum speed of nearly 1 m/s. The nominal thrust force at a 1:100 gear ratio is 6.4 N which, theoretically speaking, is sufficient for climbing vertically (almost twice the weight). The robot was run at cm/s with spoke legs and a low sprawl angle of 15 degrees. FIG. 9 presents the results of the paths of 10 runs (out of 10) that were recorded using an Optitrack tracking system setup (12 Prime 13 cameras—1.3 MP). The robot's maximum deviation from the straight line was less than 5 degrees. It should be noted that the error was partially due to the orientation inaccuracy when placing the robot at the start of the experiment. The average standard deviation of the yaw angle in all the experiments was only 1.86 degrees.

Experiment 2—Vertical Climbing

Figure 10:
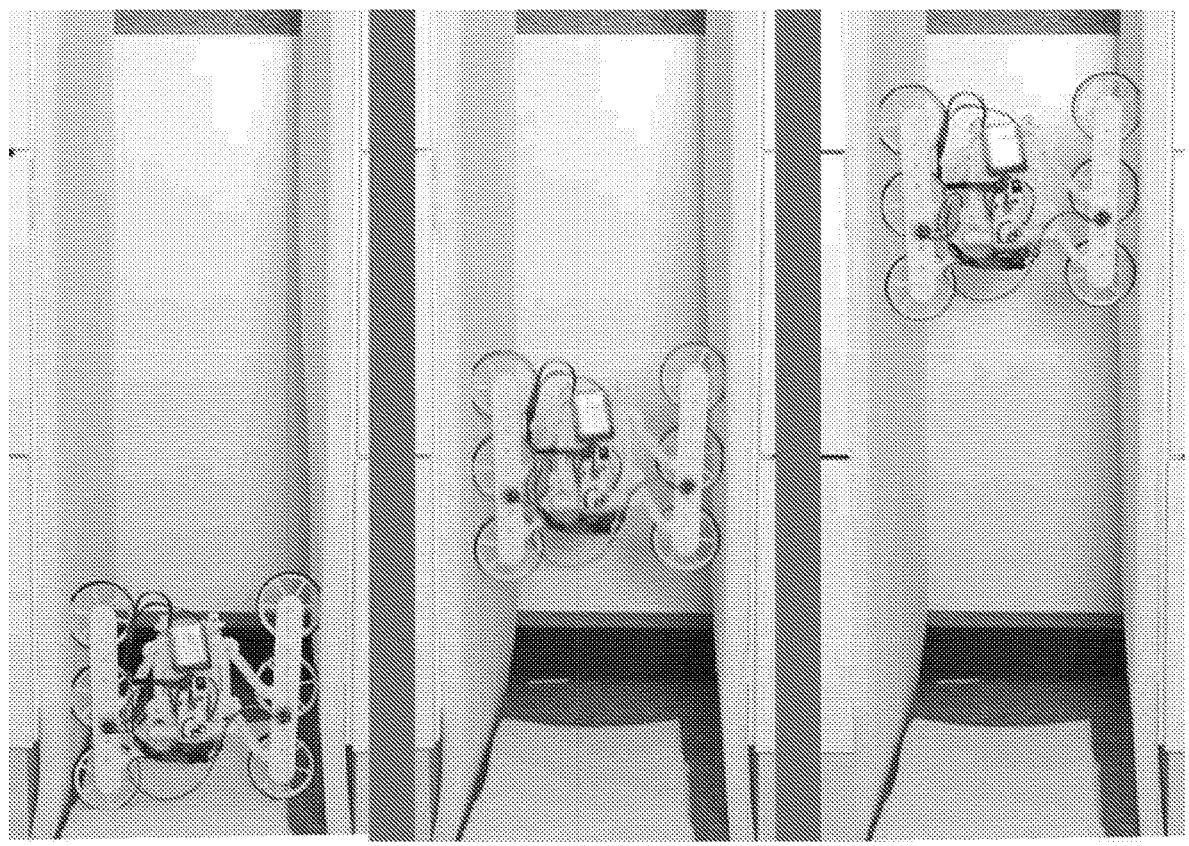
FIG. 10 shows a vertical climbing example according to an embodiment of the present invention.

A major advantage of the present invention is the ability of robot 10 to apply force and climb between two walls vertically. The robot device 10 width can be varied to touch both sides of the walls. Due to internal friction losses which increase substantially during climbing because of the normal forces that must be applied to the walls, the gear ratio had to be increased to 1:300. At this ratio, the horizontal speed drops to 35 cm/s but the thrust force increased to 17 N and the robot successfully climbed when placed vertically at 20 cm/s (see FIG. 10). The robot device 10 embodiment used was fitted with regular wheels 340.

Experiment 3—Turtle Locomotion Gait

One of the unique locomotion gaits that the robot device 10 can perform is a turtle-like locomotion gait. While the turtle gait is a slow method of crawling, it is very effective on soft and slippery ground and when crossing gaps in the surface. This gait is made up of a sequence of four steps and is done by activating the sprawl angle and the FBEM without driving the wheels (steps shown in FIGS. 11A-11E).

Figure 11A:
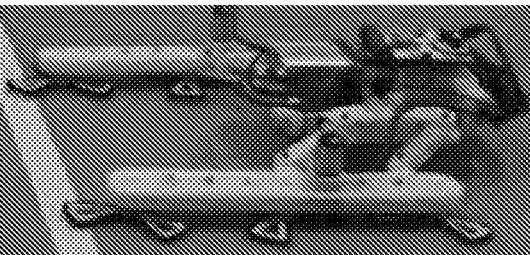
FIGS. 11A-11E show a turtle locomotion gait example according to an embodiment of the present invention.

FIG. 11A shows a starting position in an almost flat configuration where the body is not touching the ground.

Figure 11B:
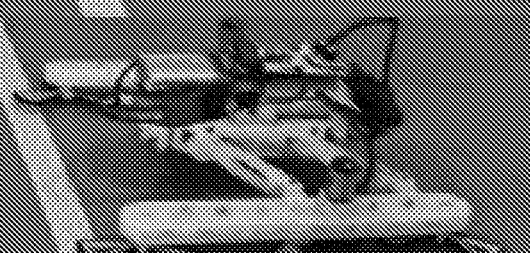

FIG. 11B shows the robot after it pushes its main body portion forward using the FBME.

Figure 11C:
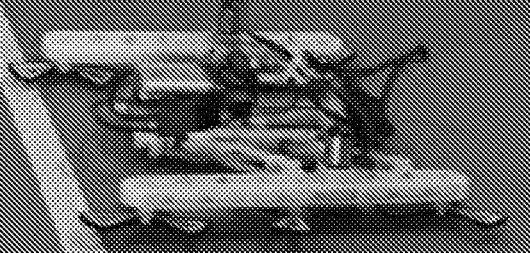

In FIG. 11C, the robot begins to lift its legs using the sprawl mechanism.

Figure 11D:
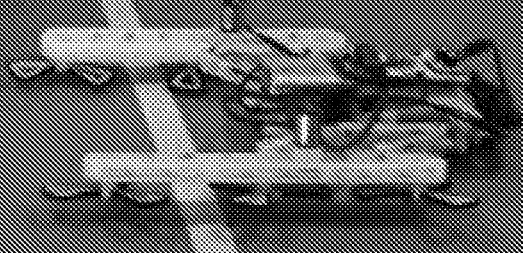

In FIG. 11D, once the legs are in the air, the robot moves its legs forward using the FBME.

Figure 11E:
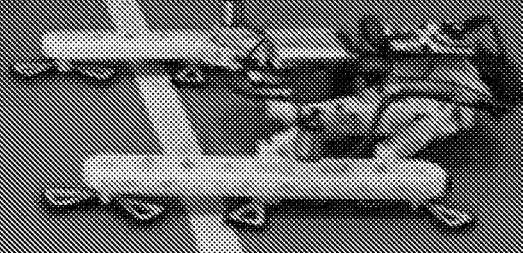
Figure 16A:
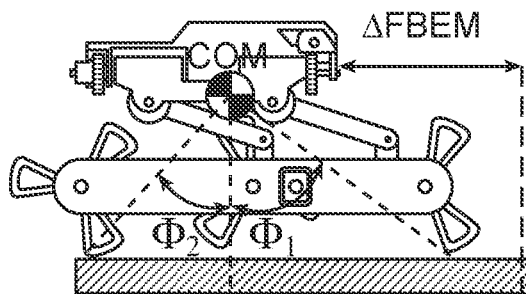
FIGS. 16A-16D show the center of mass being moved according to an embodiment of the present invention.
Figure 16B:
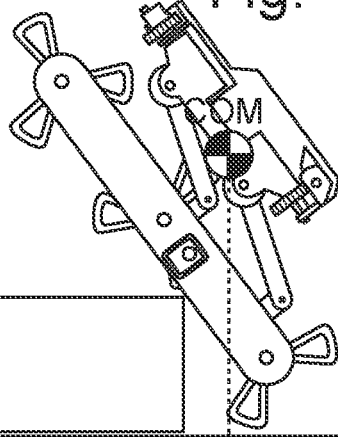
Figure 16C:
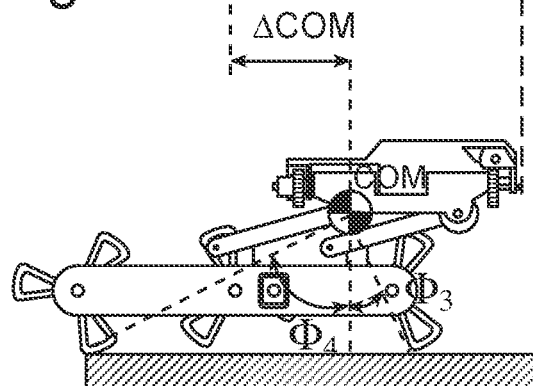
Figure 16D:
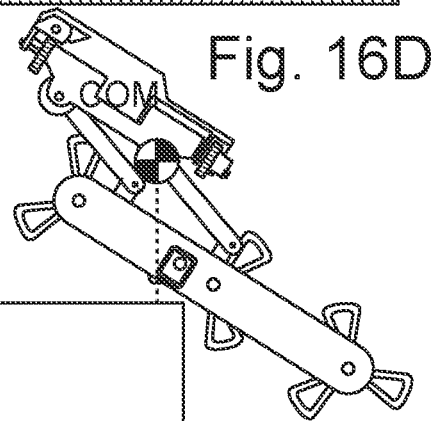

Finally, in FIG. 11E, the robot pushes its legs downwards to complete a full turtle gait cycle (wherein in the next cycle the robot 10 pushes its main body portion forward using the FBME as in FIG. 11B, etc.).

An experiment consisting of 5 cycles was applied. The robot advanced 30 cm at a rate of 6 cm/cycle. The advance per cycle was ⅓ less than the maximum possible distance (9 cm). This is because the FBME was not moved to its maximum range to avoid causing possible damage to the gears.

Experiment 4—Turtle Gait Climbing

The following experiment shows strategies for overcoming obstacles. One example of the robot 10 shows an embodiment with a minimum height of 35 mm, achieved at the nearly flat configuration (wherein a minimum of 3 to 5 degrees sprawl is required to ensure it can advance). However, this embodiment of the present invention robot device 10 is also very efficient in climbing over obstacles of up to 6.5 cm by implementing different techniques using the sprawl and FBEM mechanisms.

The turtle gait (as described above) is also an efficient way to crawl and even climb over obstacles, as shown in FIGS. 12A-12F. Using the turtle gait, the robot can crawl and climb over a 5.3 cm obstacle. FIGS. 12A-12F shows the present invention device 10 climbing over an obstacle (onto a surface of a higher level) using the turtle locomotion gait which is achieved by the actuation of both the sprawl angle and the four-bar extension mechanisms.

FIG. 12A shows a starting position.

FIG. 12B shows the robot after lifting its legs using the sprawl mechanism.

FIG. 12C shows the robot after it pushes its legs forward using the FBME.

FIG. 12D shows the robot after lowering its legs using the sprawl mechanism. Due to the COM position (see kinematics section herein) the robot device 10 tilts backwards.

FIG. 12E shows the robot device 10 main body portion moving distally (while still being tilted) by actuating the leg motors that drive the spoke wheels. In this step the robot 10 advances distally until portions of the legs are positioned above the higher level surface.

FIG. 12F shows the robot device 10 after it has pushed its main body portion forward using the FBME, causing the COM to move forward and at a certain point the robot device 10 tilts forward until the legs become on (and parallel to) the higher level surface ready to continue driving distally on the higher level surface.

Experiment 5—Pitching Upward for Climbing

The following experiment also shows strategies for overcoming obstacles. The task is similar to the experiment above but uses a different approach. The robot device 10 can reach the tip of the obstacle by pitching its body upward and advancing towards the obstacle as seen in FIGS. 13A-13F. The robot 10 is seen climbing on top of the obstacle by pitching its body upward and then moving its COM across the edge of the obstacle.

FIG. 13A shows a starting position.

FIG. 13B shows the robot after sprawling the legs closer together (using the sprawl mechanism) and accelerating the main body portion proximally to pitch its body upwards.

FIG. 13C shows the robot device 10 body in the upwards direction.

FIG. 13D shows the robot 10 after using the spoke wheels to advance forward to the obstacle (higher level surface) until the robot 10 has engaged the obstacle.

FIG. 13E shows that by reducing the sprawl the robot 10 falls on the obstacle (higher level surface).

FIG. 13F shows the robot device 10 after it has moved the main body portion (and thus its COM) forward and drives its spoke wheels forward to complete its climb.

Experiment 6—Inverted Running, Combining Wheels and Spoke Wheels

The present invention robot device 10 can flip itself upside down and vice versa without external intervention. In the embodiment shown in FIGS. 14A-14D the robot is fitted with spoke wheels on one side and regular wheels on the other. The spoke wheels at a low sprawl angle (15 degrees) have a mechanical COT (not including electrical losses) of nearly 0.2 (wherein the mechanical COT is the total work required to move the robot divided by its weight times distance travelled; COT=work/(weight*distance)). Although this COT is relatively low compared to robots at this scale, it remains two orders of magnitude higher than the rolling friction (or rolling resistance) of the wheels. Therefore, to reduce the COT (and therefore extend the working range of the robot) and also to reduce the vibrations resulting from the spoke wheel collisions with the surface, the robot can be run when inverted over smooth surfaces such that the regular wheels engage the surface.

The present invention robot device 10 can flip itself upside down so that it can be driven on one side with wheels over flat surfaces and the other side with spoke wheels over challenging surfaces in unstructured environments. The robot can be flipped back if necessary to crawl over unstructured ground. all control laws remain consistent and the leg drive and steering control continue to function as expected.

FIG. 14A shows a starting position where the spoke wheels are engaging the ground (positioned on the inner side of the legs). The robot 10 is pitched in the upwards direction as in FIG. 13C.

FIG. 14B shows the robot 10 enlarging the sprawl angle.

FIG. 14C shows the robot device 10 flipping by enlarging the sprawl angle such that the COM caused the flip.

FIG. 14D shows the robot 10 after being flipped (being in the orientation opposite to that of the starting position), where the regular wheels are engaging the ground (positioned on the inner side of the legs).

Experiment 7—Running over a Variety of Surfaces

The robot 10 was tested outdoors crawling over a variety of challenging surfaces in unstructured environments (examples shown in FIG. 15). The robot successfully crawled over gravel and even climbed a small rocky incline. The robot also crawled successfully over grass and rough sandy surfaces and climbed over concrete.

Kinematic and Dynamic Analysis

The following portion provides an additional analyzation of the kinematics and dynamics of the robot device. The different configurations that the robot can achieve are presented, and the evaluation of the torque requirements of the motors as a function of the external forces are presented. This force and torque analysis was implemented during the design of a particular example robot and motor choice (with a safety factor of 3-4) according to one particular embodiment (this example robot is referred to herein as "Rising STAR" or "RSTAR"). In the following analysis the following values of the example robot are used: $m_{body}$=182 grams, $m_{leg}$=57 grams, $L_{bar}$=5 cm, $L_{leg}$=2.7 cm, $L_1$=2 cm and $L_2$=2 cm.

Kinematic Analysis

The position of the contact points of the legs of the RSTAR with the surface, relative to its body, is a function of the sprawl angle and FBEM orientation. The work volume of the legs constitutes a two-dimensional shell as illustrated in FIGS. 7A-7B. FIGS. 7A-7B show the work volume of the legs of RSTAR which constitutes a two-dimensional shell. FIG. 7A shows a front view showing the work volume of the sprawl angle. FIG. 7B shows a top view showing the work volume of the FBEM.

Denoting the term $L_1+L_2+L_{leg}+L_{bar}(r)$ by $L_t$, the width of the contact point of the spoke-wheels or wheels of the legs (as defined in FIGS. 6A-6B) is:

$$\text{width}=L_w-L_3 \sin(\rho)+2L_t \cos(\rho) \tag{1}$$

Because RSTAR can move the FBEM mechanism orientation from negative 72° to positive 72°, the legs can move in the fore-aft direction relative to the body by:

$$\Delta\text{foreaft}=2L_{bar} \cos(\gamma=72°)=1.9L_{bar} \tag{2}$$

which is 9.5 cm in RSTAR. The height RSTAR is:

$$\text{height}=L_t \sin(\rho)+L_h+L_3 \cos(\rho) \tag{3}$$

Because the sprawl angle can be moved in the range of negative 63° to positive 90°, the tips of the legs can be moved in the vertical direction by 22.6 cm.

The Mobility of the Center of Mass

FIGS. 16A-16D show the center of mass (COM) of the RSTAR which can be moved in the fore-aft direction using the FBEM, thus allowing the robot to climb over obstacles and to pitch upward by accelerating. The mobility of the center of mass (COM) can be used to enhance the stability of the robot and increase its maneuverability and ability to climb over obstacles. Raising and lowering the COM and moving it forward and backward relative to the legs can be used to flip the robot upside down and climb over a variety of obstacles. In the fore-aft direction, the position of the COM is varied by activating the FBEM alone (see FIGS. 16A and 16C). The core mass of the robot is on the main body which we denote by $m_{body}$ whereas the mass of each set of legs is $m_{leg}$. Neglecting the weight of the bars (nearly 3 grams each), the position of the center of mass is shifted forward and backward by:

$$\Delta COM_{foreaft} = \frac{2L_{bar}\sin(\gamma_{max})m_{body}}{m_{body}+2m_{leg}} \tag{4}$$

where $\gamma$max is the maximum orientation angle of the FBEM.

In the vertical direction, the COM can be moved from the in-plane configuration (zero sprawl-minimum height) to the 90 degrees sprawl configuration (maximum height) by:

$$\Delta COM_{height} = \frac{(L_1+L_2+L_{leg}+L_{bar})m_{body}}{m_{body}+2m_{leg}}. \tag{5}$$

The COM can be shifted in the fore-aft direction by 5.84 cm and in the vertical direction by 7.19 cm. The angle $\Phi$ is the maximum tilt angle that the robot can statically withstand in the pitch direction before tipping over (see FIGS. 16A-16D). In this current design, the values of $\Phi$ are: $\Phi_1$=54°, $\Phi_2$=44°, $\Phi_3$=26°, $\Phi_4$=63°.

Alternatively, by accelerating over a horizontal surface the robot can pitch upward. A climbing technique based on pitching upward by accelerating is discussed herein in relation to FIGS. 13A-13F. The required acceleration a to pitch upward is:

$$a>g \tan(\Phi) \tag{6}$$

Where g is the gravity. For the given values $\Phi_1$-$\Phi_4$, the minimum required accelerations for pitching upward are respectively: [1.38 g, 0.96 g, 0.49 g, 1.96 g]. Note that for the cases 1 and 3, the acceleration is from right to left. Whereas, for the cases 2 and 4, the acceleration is from left to right.

Force Analysis

Figure 17:
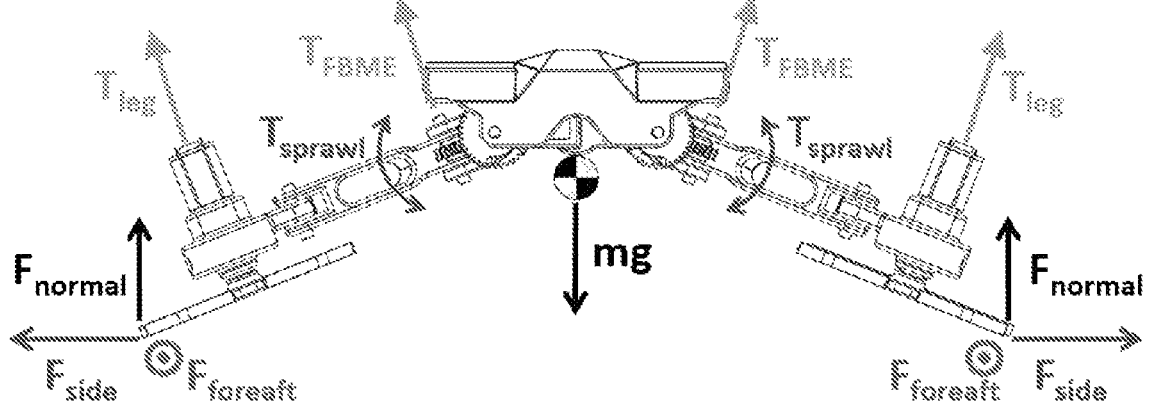
FIG. 17 shows the force acting on the robot when moving over a horizontal surface according to an embodiment of the present invention.

In this section, calculations are made for the forces acting on the robot and the torques that must be provided by the different motors of the robot when moving on a horizontal surface and during climbing vertically between two walls. The cases where the robot works against gravity (raising its COM) which require larger torque forces are calculated. The absolute values of the forces acting on one side of the legs, in the normal, side, and fore-aft directions, relative to the body of the robot, are denoted by Fnormal, Fside, and Fforeaft (see FIG. 17). FIG. 17 shows the force acting on the robot when moving over a horizontal surface. When lifting its body through the sprawl or the FBEM mechanisms, both the normal force and the friction side forces resist the motion.

When the robot lifts its body over a horizontal surface, either by increasing the sprawl angle or by extending its legs using the FBEM, and assuming low accelerations, the normal force $F_{normal}$ is:

$$|F_{normal}| = \frac{mg}{2}. \tag{7}$$

Where m is the total mass of the robot. The side force $F_{side}$ is:

$$|F_{side}| = \mu\frac{mg}{2}. \tag{8}$$

Note that $F_{side}$ is pointed outwards when the robot increases the sprawl angle and inwards when it extends the length of its legs using the FBEM.

When the robot climbs vertically at constant speed inside between two walls, the forces acting on the robot are in the fore-aft and side directions alone. The fore-aft force $F_{foreaft}$ that results from the friction force of the legs against the wall is equal to half of the weight:

$$|F_{foreaft}| = \frac{mg}{2}. \quad (9)$$

The normal force on the other hand cannot be exactly calculated but must be large enough to satisfy (10):

$$|F_{side}| > \frac{mg}{2\mu}. \quad (10)$$

Torque Analysis

A force diagram of the robot is presented in FIG. 17. The torque acting on the sprawl joint $T_{sprawl}$ is a function of the sprawl angle $\rho$ and the FBEM orientation $\gamma$.

$$|T_{sprawl}| = \frac{mg}{2}L_t\cos(\rho) + \mu\frac{mg}{2}(L_t\sin(\rho) + L_3\cos(\rho)). \quad (11)$$

Rearranging (11), we obtain:

$$|T_{sprawl}| = \frac{mg}{2}L_t(\cos(\rho)(1+\mu L_3) + \mu\sin(\rho)). \quad (12)$$

The required torque by the FBEM when extending its legs is:

$$|T_{FBME}| = \frac{mg}{2}(\sin(\rho) + \mu\cos(\rho))L_{bar}\sin(\gamma). \quad (13)$$

Assuming that the COF $\mu$ is 0.3 (plastic contact with tile floor), the maximum $T_{sprawl}$ is obtained at $\rho=12°$ and its value is 25.4 Ncm whereas the maximum $T_{FBME}$ is obtained at $\rho=74°$ and $\gamma=90°$ and its value is 8.14 Ncm.

When climbing vertically between two walls, the robot must apply a side force $F_{side}>mg/2\mu$. The torques that the sprawl mechanism must apply are:

$$|T_{sprawl}| > \frac{mg}{2\mu}(L_t\sin(\rho) + L_3\cos(\rho)). \quad (14)$$

The torque required by the FBEM is $$|T_{FBME}| = \frac{mg}{2\mu}(\sin(\rho) + \mu\cos(\rho))L_{bar}\sin(\gamma). \quad (15)$$

The maximum $T_{sprawl}$ is obtained at $\rho=90°$ and its value is 60 Ncm whereas the maximum $T_{FBME}$ is obtained at $\rho=72°$ and $\gamma=90°$ and its value is 27.1 Ncm.

The torque acting on each set of legs, $T_{leg}$, during climbing in between two walls is $$|T_{leg}| = \frac{mg}{2}L_{leg}. \quad (16)$$

where $L_{leg}$ is the length of the spokes of the wheels or the radius of the wheels. Note that climbing is much easier with wheels rather than with spoke wheels.

While some of the embodiments of the invention have been described by way of illustration, it will be apparent that the invention can be carried into practice with many modifications, variations and adaptations, and with the use of numerous equivalents or alternative solutions that are within the scope of a person skilled in the art, without departing from the spirit of the invention, or the scope of the claims.

The invention claimed is:

1. A robot device comprising a main body portion and two elongated legs, wherein:
   a) each of the elongated legs is connected to the main body portion by a four-bar extension mechanism; and
   b) each of the elongated legs is rotatable around a corresponding axis positioned along a distal-proximal direction, wherein each four-bar extension mechanism comprises a distal bar and a proximal bar;

wherein the proximal bar is connected at one end to the main body portion in a first joint connection and at the other end to the elongated leg in a second joint connection;

wherein the distal bar is connected at one end to the elongated leg in a third joint connection and at the other end to the main body portion in a fourth joint connection;

wherein the main body portion comprises two side rotatable shafts, each rotatable around a corresponding axis of said corresponding axes; and wherein in the each four-bar extension mechanism the connections of the proximal and distal bars with the main body portion are at a corresponding rotatable shaft of the two rotatable shafts.

2. The robot device according to claim 1, wherein each joint of the joint connections is a revolute joint.

3. The robot device according to claim 1, further comprising a sprawl motor and a sprawl gear system, wherein the sprawl motor is configured to generate the sprawl gear system to cause the shafts to rotate to the same extent in opposite directions.

4. The robot device according to claim 3, wherein the sprawl gear system is a spur gear system;
   wherein the device comprises a first spinning spur gear and a second spinning spur gear;
   wherein each of the rotatable shafts comprise an arched shaped spur gear element;
   wherein the sprawl motor is configured to rotate the first spinning spur gear;
   wherein the first spinning spur gear meshes with the second spinning spur gear;
   wherein the first spinning spur gear meshes with an arched shaped spur gear element of a first rotatable shaft of the rotatable shafts; and
   wherein the second spinning spur gear meshes with an arched shaped spur gear element of a second rotatable shaft of the rotatable shafts.

5. The robot device according to claim 1, comprising a first sprawl motor, a first sprawl gear system, a second sprawl motor and a second sprawl gear system,
   wherein the first sprawl motor is configured to generate the first sprawl gear system to cause one of the shafts to rotate; and
   wherein the second sprawl motor is configured to generate the second sprawl gear system to cause the other shaft of the shafts to rotate.

6. The robot device according to claim 1, further comprising an FBEM motor and an FBEM gear system, wherein the FBEM motor is configured to generate the FBEM gear system to cause each four-bar extension mechanism proximal and distal bars to rotate around their corresponding first and fourth joints respectively.

7. The robot device according to claim 6, wherein the FBEM gear system comprises a worm drive arrangement;
   wherein the main body portion comprises two side longitudinal rods;
   wherein the device further comprises two side worm screws each mounted on a corresponding rod of the two side longitudinal rods;
   wherein each four-bar extension mechanism comprises a first worm gear fixed to one end of the proximal bar and rotatable around the axis of its first joint and a second worm gear fixed to one end of the distal bar and rotatable around the axis of its fourth joint; and
   wherein each four-bar extension mechanism first and second worm gears both mesh with a corresponding side worm screw of the two side worm screws.

8. The robot device according to claim 7, wherein the FBEM motor is configured to rotate a third worm screw that meshes with a third worm gear element and a fourth worm gear element; and
   wherein the third worm gear element meshes with a first side worm screw of the two side worm screws and the fourth worm gear element meshes with a second side worm screw of the two side worm screws.

9. The robot device according to claim 7, wherein the FBEM gear system comprises a rack and pinion arrangement;
   wherein the main body portion comprises two side longitudinal rods;
   wherein the device further comprises two side rack elements each mounted on a corresponding rod of the two side longitudinal rods;
   wherein each four-bar extension mechanism comprises a first pinion element fixed to one end of the proximal bar and rotatable around the axis of its first joint and a second pinion element fixed to one end of the distal bar and rotatable around the axis of its fourth joint; and
   wherein each four-bar extension mechanism first and second pinion elements both mesh with a corresponding side rack element of the two side rack elements.

10. The robot device according to claim 9, wherein the FBEM motor is configured to rotate a worm screw that meshes with a first worm gear element and a second worm gear element;
    wherein the first worm gear element comprises a third pinion element;
    wherein the second worm gear element comprises a fourth pinion element;
    wherein the third pinion element meshes with a first side rack element of the two side rack elements; and
    the fourth pinion element meshes with a second side rack element of the two side rack elements.

11. The robot device according to claim 1, comprising a first FBEM motor, a first FBEM gear system, a second FBEM motor and a second FBEM gear system,
    wherein the first FBEM motor is configured to generate the first FBEM gear system to cause one leg of the legs to move; and
    wherein the second FBEM motor is configured to generate the second FBEM gear system to cause the other leg of the legs to move.

12. The robot device according to claim 1, wherein each of the elongated legs comprises:
    a leg motor;
    two or more wheels; and
    a leg gear system,
    wherein the leg motor is configured to generate the leg gear system to cause the two or more wheels to rotate.

13. The robot device according to claim 12, wherein the leg gear system is a spur gear system;
    wherein the device comprises a plurality of adjacent meshing spur gears wherein each two adjacent spur gears of the plurality of adjacent meshing spur gears mesh with one another; wherein each one of the two or more wheels and a corresponding spur gear of the plurality of adjacent meshing spur gears are mounted on a common axle and fixed thereto at their centers; and
    wherein each leg motor is configured to rotate one of the plurality of adjacent meshing spur gears on a corresponding leg.

14. The robot device according to claim 13, wherein two given spur gears, each mounted on corresponding common axles of the common axles have an odd number of spur gears, of the plurality of adjacent meshing spur gears, therebetween.

15. The robot device according to claim 12, wherein one or more of the two or more wheels are spoked wheels; and
    wherein each of the spoked wheels comprises:
    a central aperture configured to be mounted on an axle;
    N sectors, each bounded by two arms extending outwards from a ring portion surrounding the central aperture; and
    an arc portion lying between the outer ends of the arms.

16. The robot device according to claim 1,
    wherein each four-bar extension mechanism comprises a distal bar and a proximal bar;
    wherein the proximal bar is connected at one end to the main body portion in a first joint connection and at the other end to the elongated leg in a second joint connection;
    wherein the distal bar is connected at one end to the elongated leg in a third joint connection and at the other end to the main body portion in a fourth joint connection;
    wherein each four-bar extension mechanism comprises a distal bar and a proximal bar;
    wherein the proximal bar is connected at one end to the main body portion in a first joint connection and at the other end to the elongated leg in a second joint connection;
    wherein the distal bar is connected at one end to the elongated leg in a third joint connection and at the other end to the main body portion in a fourth joint connection;
    wherein the device further comprises a sprawl motor and a sprawl gear system, wherein the sprawl motor is configured to generate the sprawl gear system to cause the shafts to rotate to the same extent in opposite directions;
    wherein the device further comprises an FBEM motor and an FBEM gear system, wherein the FBEM motor is configured to generate the FBEM gear system to cause each four-bar extension mechanism proximal and distal bars to rotate around their corresponding first and fourth joints respectively;

wherein each elongated leg comprises:
a leg motor;
two or more wheels; and
a leg gear system;
wherein the leg motor is configured to generate the leg gear system to cause the two or more wheels to rotate:
wherein the device further comprises:
a controller connected to and configured to activate at least one of the following:
the sprawl motor;
the FBEM motor; and
at least one of the two leg motors; and
wherein the device further comprises a power source configured to power the sprawl motor, FBEM motor and leg motors.

17. A system comprising:
a) the robot device according to claim 16; and
b) a remote-control configured to transmit instructions to activate one or more of the robot device motors.

18. The system according to claim 17, wherein the robot device comprises a receiver connected to the controller;
wherein the remote-control comprises a transmitter; and
wherein the receiver is configured to receive the remote-control instructions transmitted by the transmitter to activate the one or more of the robot device motors.

* * * * *